United States Patent [19]
Iijima

[11] Patent Number: 5,381,478
[45] Date of Patent: Jan. 10, 1995

[54] CIPHER COMMUNICATION SYSTEM FOR TRANSACTION DATA

[75] Inventor: Yasuo Iijima, Yokohama, Japan

[73] Assignee: Kabushiki Kaisha Toshiba, Kawasaki, Japan

[21] Appl. No.: 832,042

[22] Filed: Feb. 6, 1992

[30] Foreign Application Priority Data

Feb. 8, 1991 [JP] Japan .................. 3-017592

[51] Int. Cl.⁶ .............................. H04L 9/06
[52] U.S. Cl. ...................... 380/44; 380/23
[58] Field of Search .............. 380/21, 23, 24, 25, 380/49

[56] References Cited

U.S. PATENT DOCUMENTS

| | | | |
|---|---|---|---|
| 4,193,131 | 3/1980 | Lennon et al. | 380/25 |
| 4,218,738 | 8/1980 | Matyas et al. | 380/25 |
| 4,423,287 | 12/1983 | Zeidler | 380/25 |
| 4,605,820 | 8/1986 | Campbell, Jr. | 380/25 |
| 4,649,233 | 3/1987 | Bass et al. | 380/21 |
| 4,720,859 | 1/1988 | Aaro et al. | 380/21 |
| 4,747,050 | 3/1988 | Brachtl | 380/24 |
| 4,755,940 | 7/1988 | Brachtl et al. | 380/24 |
| 4,850,017 | 7/1989 | Matyas, Jr. et al. | 380/21 |
| 4,888,800 | 12/1989 | Marshall et al. | 380/21 |
| 4,912,762 | 3/1990 | Lee et al. | 380/24 |
| 4,924,513 | 5/1990 | Herbison et al. | 380/21 |
| 5,148,534 | 4/1992 | Comerford | 380/25 |
| 5,224,163 | 6/1993 | Gasser et al. | 380/23 |

FOREIGN PATENT DOCUMENTS

| | | |
|---|---|---|
| 148960 | 7/1985 | European Pat. Off. |
| 387599 | 9/1990 | European Pat. Off. |
| 422230 | 4/1991 | European Pat. Off. |
| 440800 | 8/1991 | European Pat. Off. |
| 250309 | 12/1987 | France |
| 253722 | 1/1988 | France |

Primary Examiner—Salvatore Cangialosi
Attorney, Agent, or Firm—Cushman, Darby & Cushman

[57] ABSTRACT

A cipher communication system for communicating transaction data between a host computer and a portable electronic device, wherein the host computer includes a first memory for storing a master key data, a generator for generating a transaction key data which is used for enciphering the transaction data, a data converter for enciphering the transaction key data according to the transaction key data and a first interface for transferring the transaction key data enciphered by the data converter, and wherein the portable electronic device includes a second interface for receiving the enciphered transaction key data transferred from the host computer, a second memory for storing the master key data, a second data converter for deciphering the enciphered transaction key data received by the second interface and a third memory for storing the transaction key data deciphered by the second data converter, in the manner causing the stored transaction key to be eliminated at a completion of the communication.

3 Claims, 23 Drawing Sheets

COMMAND A

| FUNCTION CODE | KEY SPECIFIER | TRANSACTION KEY DATA KEY5' |
|---|---|---|

Fig. 12A

RESPONSE a

| FUNCTION CODE | STATUS | TRANSACTION KEY DATA KEY5 |
|---|---|---|

Fig. 12B

COMMAND B

| FUNCTION CODE | TRANSACTION KEY DATA KEY5 |
|---|---|

Fig. 13A

RESPONSE b

| FUNCTION CODE | STATUS |
|---|---|

Fig. 13B

COMMAND C

| FUNCTION CODE | KEY SPECIFIER | MASSAGE M5' |
|---|---|---|

*Fig. 14A*

RESPONSE c

| FUNCTION CODE | STATUS | MASSAGE M5 |
|---|---|---|

*Fig. 14B*

COMMAND D

| FUNCTION CODE | KEY SPECIFIER | MASSAGE M6 |
|---|---|---|

*Fig. 15A*

RESPONSE d

| FUNCTION CODE | STATUS | ENCIPHERED MASSAGE M6' |
|---|---|---|

*Fig. 15B*

COMMAND E

| FUNCTION CODE | KEY SPECIFIER | TRANSACTION KEY DATA KEY7' |
|---|---|---|

*Fig. 16A*

RESPONSE e

| FUNCTION CODE | STATUS | ENCIPHERED TRANSACTION KEY DATA KEY7 |
|---|---|---|

*Fig. 16B*

COMMAND F

| FUNCTION CODE | KEY SPECIFIER | TRANSACTION KEY DATA KEY9' |
|---|---|---|

*Fig. 17A*

RESPONSE f

| FUNCTION CODE | STATUS |
|---|---|

*Fig. 17B*

COMMAND G

| FUNCTION CODE | KEY SPECIFIER | TRANSACTION KEY DATA KEY11' |
|---|---|---|

*Fig. 18A*

RESPONSE f

| FUNCTION CODE | STATUS |
|---|---|

*Fig. 18B*

CIPHER COMMUNICATION SYSTEM FOR TRANSACTION DATA

FIELD OF THE INVENTION

The present invention relates generally to a cipher communication system for transaction data, and more particularly, to a cipher communication system for communicating transaction data between a portable electronic apparatus for storing transaction key data to be used, and or instance, a host computer on an on-line system.

BACKGROUND OF THE INVENTION

In data communications on a system consisting of a host computer and a portable electronic apparatus such as an IC card having a storage means composed of a non-volatile memory such as EEPROM, in order to assure a security of communication data, transaction data are transmitted after enciphered at a data originating end and received at a data receiving end after deciphered. In this data communication system, the enciphering and the deciphering of the transaction data are carried out through a procedure using transaction key data while performing a data transaction, such as transmission data between a host computer and an IC card. At this time, prior to the data transaction, the transaction key data to be used for the enciphering data transaction is itself enciphered and transmitted from the host computer to the IC card where it is deciphered and stored in the storage means. Enciphered data received from the host computer is deciphered using the transaction key data stored in the storage means. Thus, the data communication is achieved between the host computer and the IC card.

As described above, in the conventional data communication system to a portable electronic apparatus, for instance, when performing the data transaction on a system consisting of a host computer and IC card, transaction key data to be used for data enciphering/deciphering are stored in a non-volatile memory of an IC card. There was therefore a problem in that transaction key data which was required only for on-line communication of the communication system, was left in the IC card while in the off-line state. This makes it possible to investigate the transaction key data from the IC card during an off-line communication, causing a problem of reducing securities in the on-line system.

SUMMARY OF THE INVENTION

It is, therefore, an object of the present invention to provide a cipher communication system for communicating transaction data between a host computer and a portable electronic apparatus which is able to improve data security of an on-line system by using a portable electronic apparatus such as an IC card to store transaction key data in a non-volatile memory of the portable electronic apparatus thereby preventing the transaction key data from being left in the portable electronic apparatus after the on-line data communication has ended.

In order to achieve the object described above, presently disclosed cipher communication system for communicating transaction data between a host computer and a portable electronic device is provided, wherein the host computer includes a first memory for storing a master key data, a generator for generating a transaction key data which is used for enciphering the transaction data, a data converter for enciphering the transaction key data according to the transaction key data and a first interface for transferring the transaction key data enciphered by the data converter, and wherein the portable electronic device includes a second interface for receiving the enciphered transaction key data transferred from the host computer, a second memory for storing the master key data, a second data converter for deciphering the enciphered transaction key data received by the second interface and a third memory for storing the transaction key data deciphered by the second data converter, in the manner causing the stored transaction key to be eliminated at a completion of the communication.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 12A and 12B are diagrams showing data configurations of a command A and its response a;

FIGS. 13A and 13B are diagrams showing data configurations of a command B and its response b;

FIGS. 14A and 14B are diagrams showing data configurations of a command C and its response c;

FIGS. 15A and 15B are diagrams showing data configurations of a command D and its response d;

FIGS. 16A and 16B are diagrams showing data configurations of a command E and its response e;

FIGS. 17A and 17B are diagrams showing data configurations of a command F and its response f;

FIGS. 18A and 18B are diagrams showing data configurations of a command G and its response g;

FIG. 19 is a flow chart showing a communication process performed by using the command A and the response a;

DESCRIPTION OF THE PREFERRED EMBODIMENTS

Figure 1:
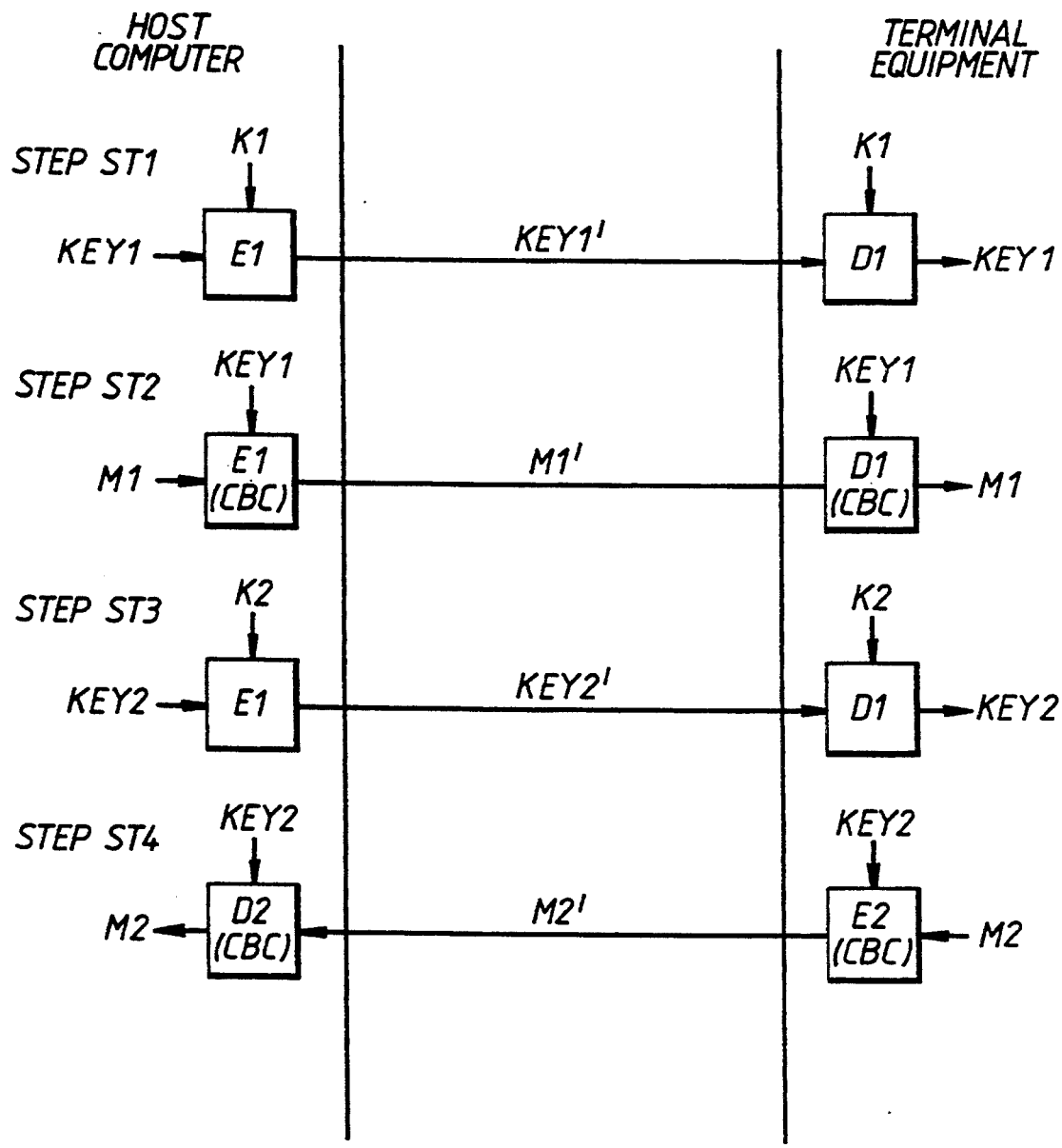
FIG. 1 is a diagram showing data communications between the host computer and the terminal equipment when they have two sets of data converters (Case I)

The present invention will be described in detail with reference to the FIGS. 1 through 26. Throughout the drawings, like or equivalent reference numerals or letters will be used to designate like or equivalent elements for simplicity of explanation.

Figure 2:
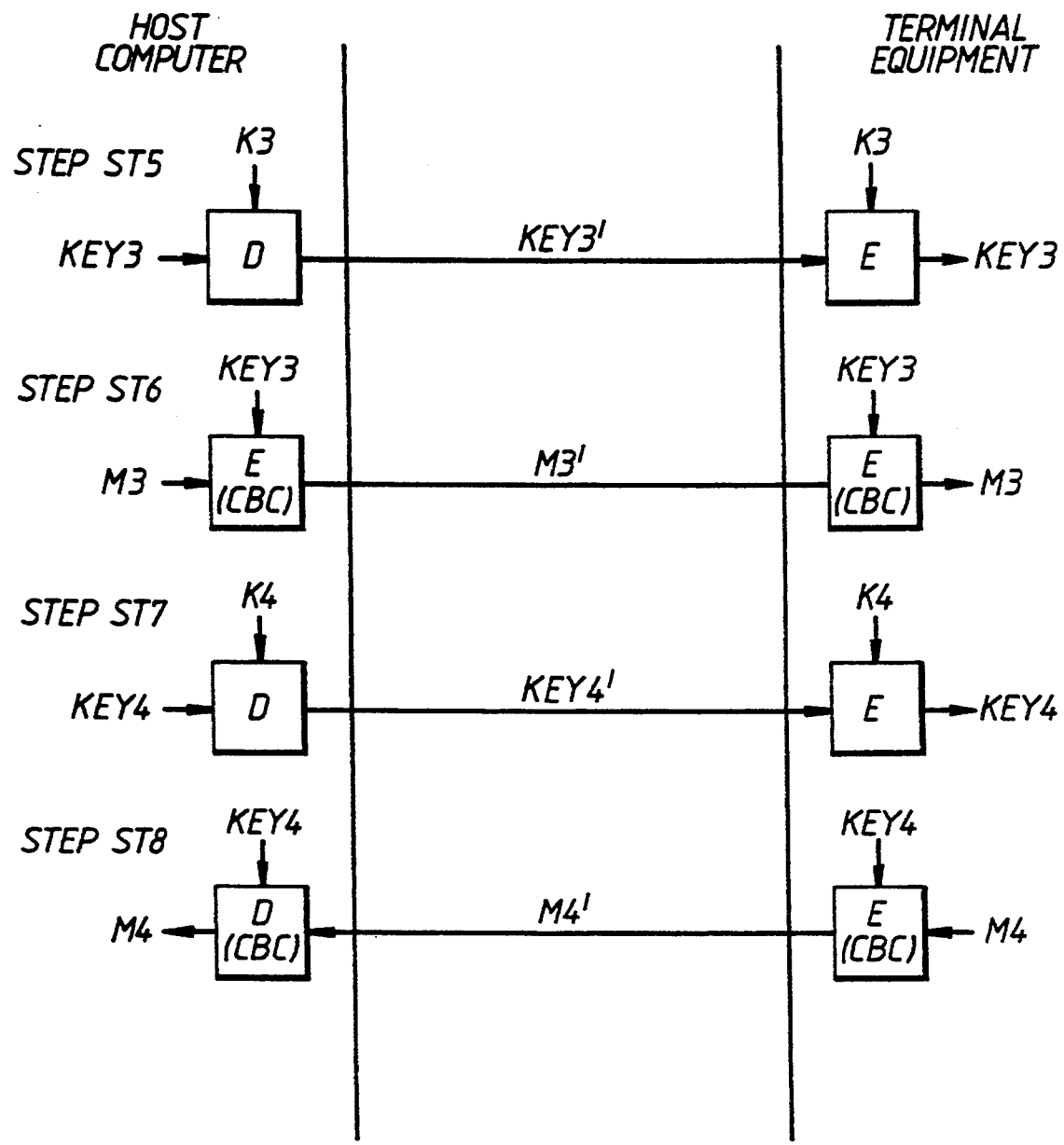
FIG. 2 is a diagram showing data communications between the host computer and the terminal equipment when they have one set of data converters (Case II)
Figure 3:
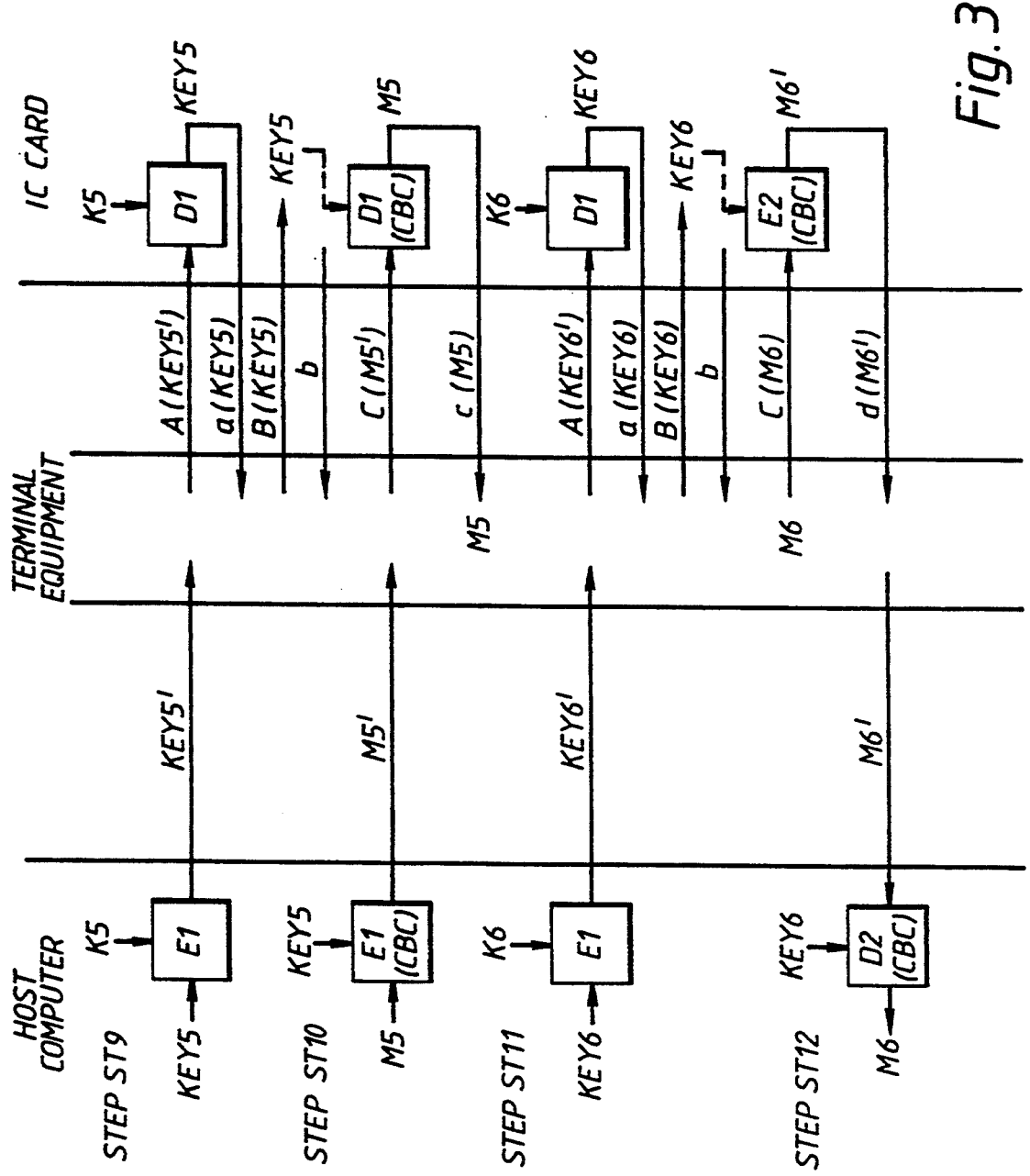
FIG. 3 is a diagram showing data communications among the host computer, the terminal equipment and the portable electronic apparatus, e.g., the IC card when the host computer and the IC card have two sets of data converters (Case III)
Figure 4:
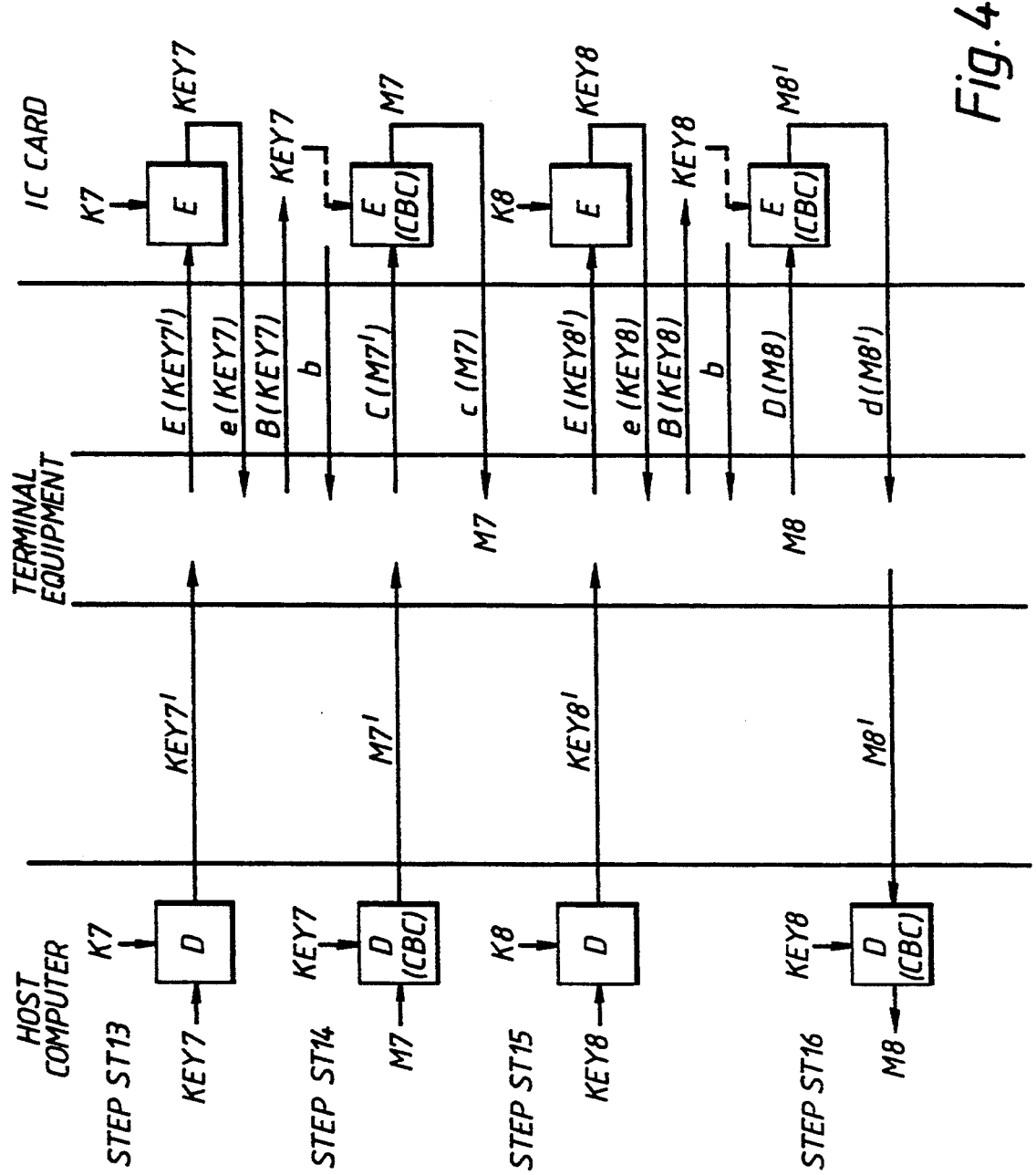
FIG. 4 is a diagram showing data communications among the host computer, the terminal equipment and the IC card when the host computer and the IC card have one set of data converters (Case IV)
Figure 5:
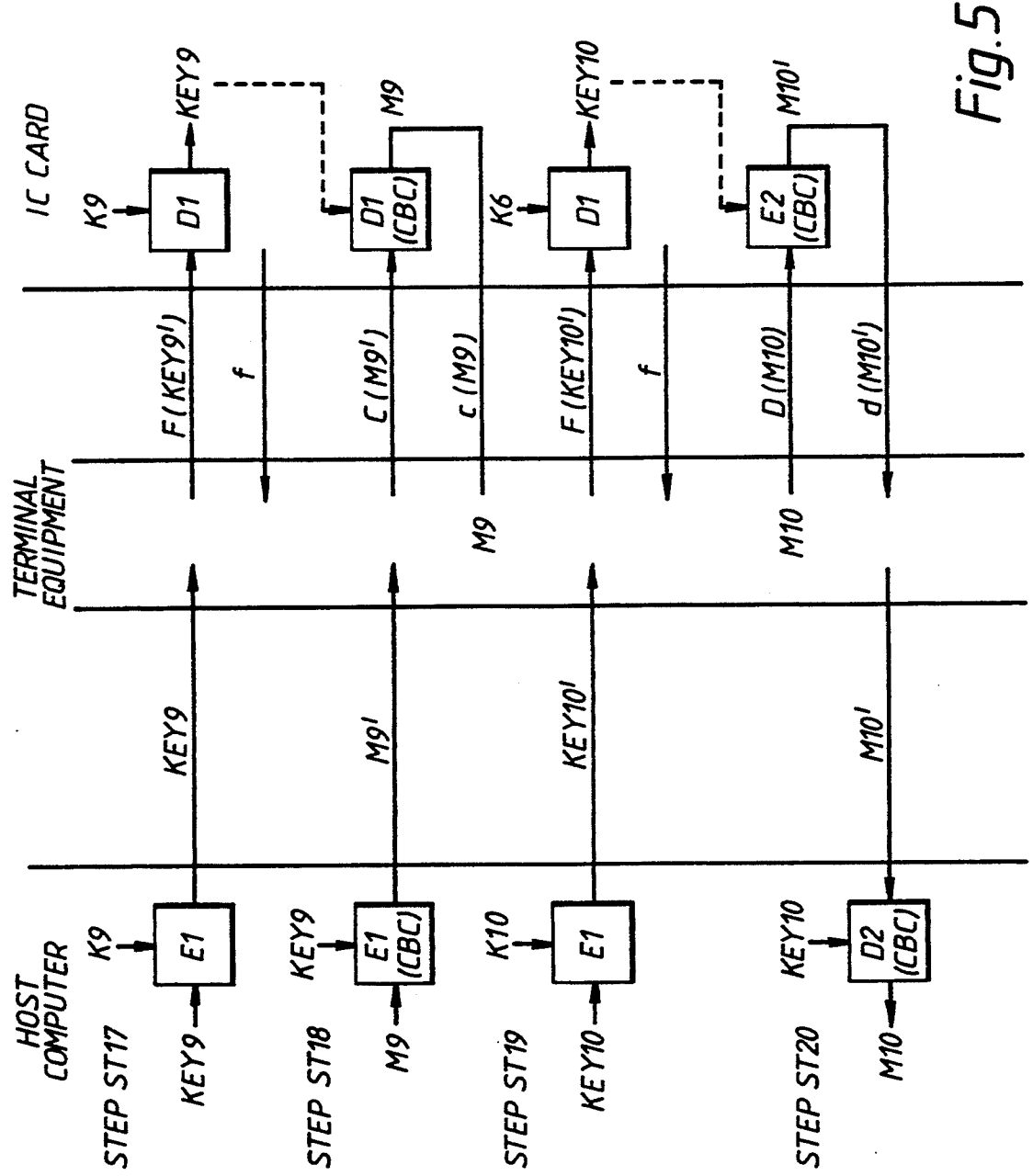
FIG. 5 is a disgram showing data communications among the host computer, the terminal equipment and the IC card when transaction key data restored and retained in the terminal equipment in Case III is changed to be retained in the IC card (Case V)
Figure 6:
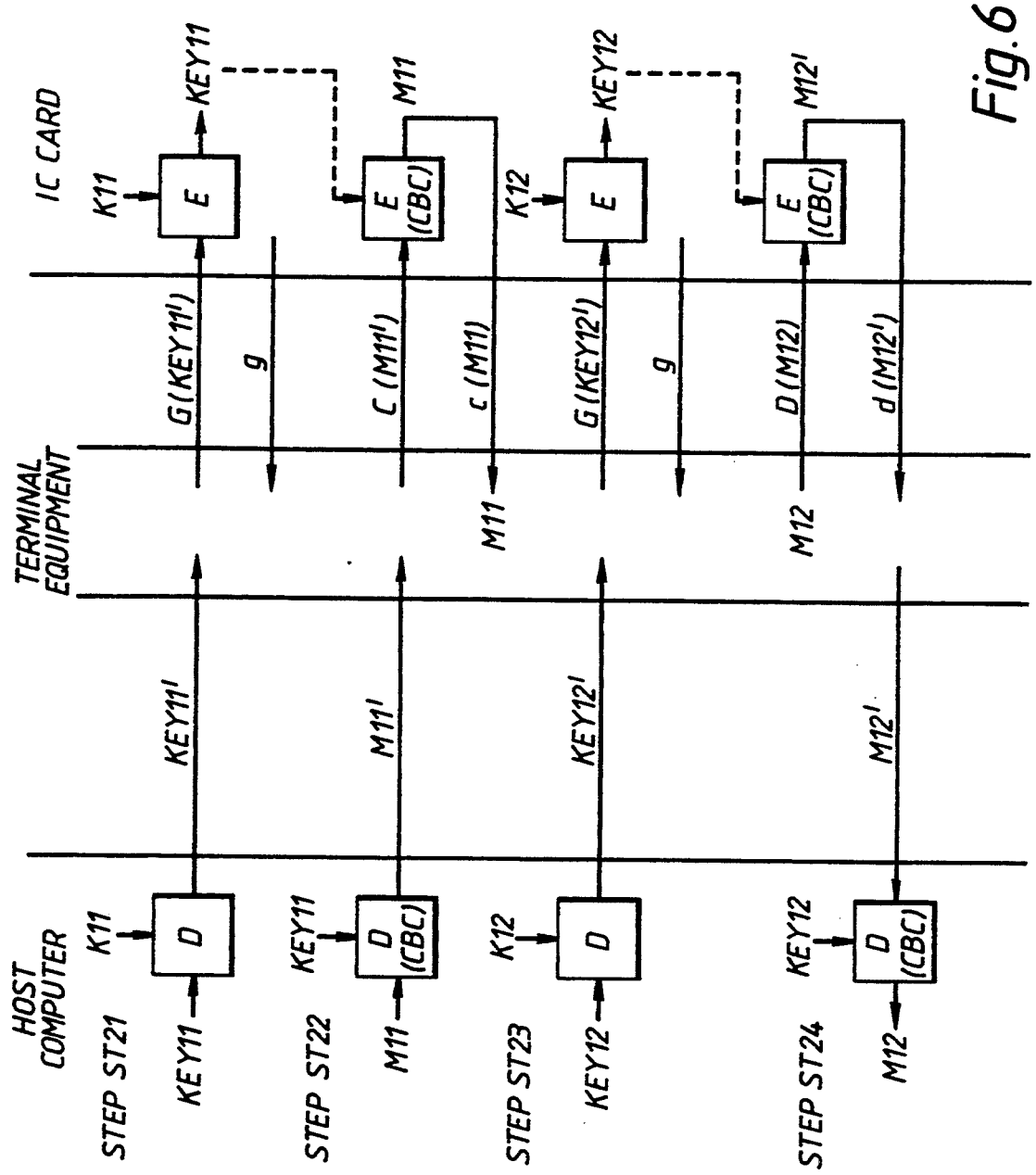
FIG. 6 is a diagram showing data communications among the host computer, the terminal equipment and the IC card when transaction key data restored and retained in the terminal equipment in Case IV is changed to be retained in the IC card (Case VI)

First, FIGS. 1 through 6 show the process of the data communication system of this embodiment. FIG. 1 shows data communications between a host computer and a terminal equipment, (e.g., a customer terminal), in a first case, where the host computer and the terminal equipment, having two sets of data converters, perform the data conversion using a different set of data converters in the data transmission and the data receiving (hereinafter referred to as Case I). FIG. 2 also show data communications between the host computer and the terminal equipment in a second case, where the host computer and the terminal equipment, having one set of the data converters, perform the data conversion using the same data converter in both the data transmission and the data receiving (hereinafter referred to as Case II). FIG. 3 shows the flow of the data communication between the host computer and the terminal equipment in a third case where The data conversion process that was performed by the terminal equipment in Case I is left to an IC card inserted in the terminal equipment (hereinafter referred to as Case III). FIG. 4 shows the flow of the data communication between the host computer and the terminal equipment in a fourth case where the data conversion process that was performed by the terminal equipment in Case II is left to an IC card inserted in the terminal equipment (hereinafter referred to as Case IV). FIG. 5 shows the flow of the data communication between the host computer and the terminal equipment in a fifth case where the transaction key restored in the IC card and held in the terminal equipment in FIG. 3 was changed to be held in the IC card (hereinafter referred to as Case V). And FIG. 6 shows the flow of the data communication between the host computer and the terminal equipment in a sixth case where the transaction key restored in the IC card and held in the terminal equipment was changed to be held in the IC card (hereinafter referred to as Case VI). The data conversion referred to here means data enciphering/deciphering.

KEYn (n represents a positive integer) in FIGS. 1 through 6 is a transaction key data that is used for the conversion process of data to be communicated in the data (message) transaction. Further, Kn in FIGS. 1 through 6 is a key data owned mutually between the host computer and the terminal equipment (Cases I and II) and between the host computer the terminal equipment (Cases I through VI) which is used for converting the transaction key data KEYn itself. That is, assuming that the transaction key scramble processing function to scramble the transaction key data KEYn to be used for the data conversion is f, and the function which is used to restore the transaction key data KEYn' that was scrambled by this function f is f', $$KEYn' = fKn (KEYn)$$

$$KEYn = f'Kn (KEYn')$$

Further, assuming that the data scramble processing function to scramble a message Mn as data to be communicated is F, and the function to restore a message Mn' which is scrambled by this function F is F', $$Mn' = F KEYn (Mn)$$

$$Mn = F'KEYN (Mn')$$

Here, the relation between the functions f and f' and that between the functions F and F' are equivalent to the relation between the data converting functions E1 and D1, that between the data converting functions E2 and D2, and that between the data converting functions E and D. These data converting functions have been incorporated in the data converters described above.

Figure 7:
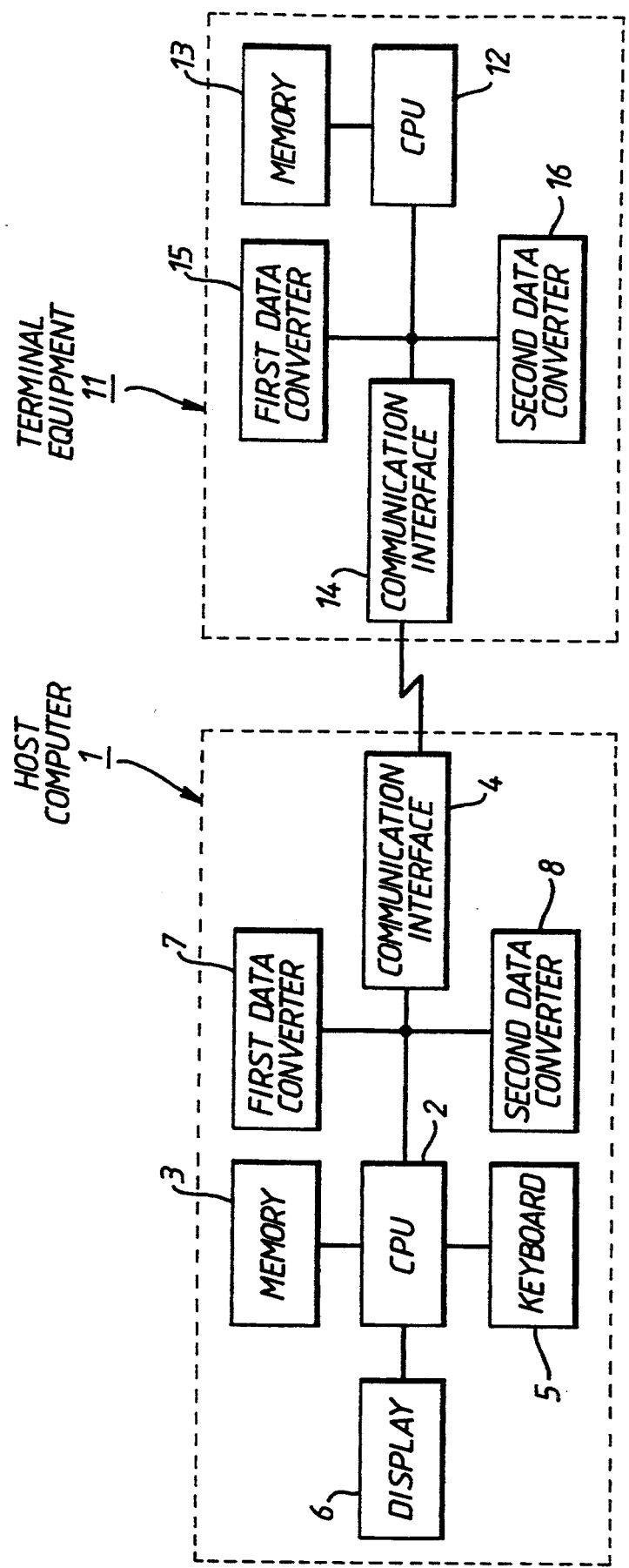
FIG. 7 is a block diagram of a system including the host computer and the terminal equipment which have two sets of data converters.
Figure 8:
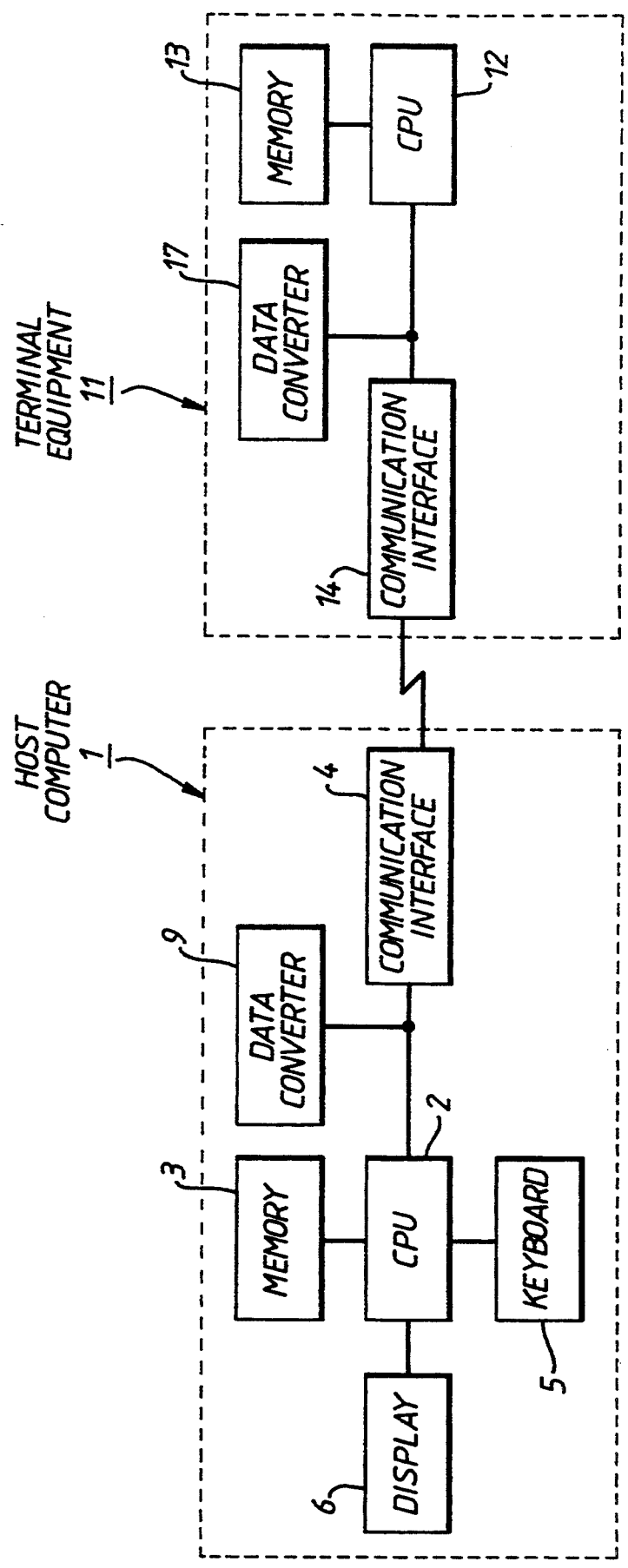
FIG. 8 is a block diagram of the system including the host computer and the terminal equipment which have one set of data converters.

In Case I shown in FIG. 7, data communications in a system including a host computer 1 and a terminal equipment 11 is illustrated. Here, the host computer 1 includes a central processing unit (CPU) 2 which controls the operation of the components of the host computer 1, a memory 3 which stores various data, a communication interface 4 which communicates with the terminal equipment 11, a keyboard 5 which is used by the user to input data, commands, etc., a display 6 including, for instance, a CRT, to display results of arithmetic operation, communicated data, etc., a first data converter 7 having the data converting function E1 and a second data converter 8 having the data converting function D2.

Further, the terminal equipment 11 includes a CPU 12 which controls the operations of components in the terminal equipment 11, a memory 13 which stores various data, a communication interface 14 which communicates with the host computer 1, a first data converter 15 having the data converting function D1 corresponding to the data converting function E1 of the data converter 7 in the host computer 1 and a second data converter 16 having the data converting function E2 corresponding to the data converting function D2 of the data converter 8.

Here, the data converted by the first data converter 7 of the host computer 1 is restored by the first data converter 15 of the host computer 1 and the data converted by the second data converter 8 of the host computer 1 is restored by the second data converter 16 of the terminal equipment 11. Inversely, the data converted by the first data converter 15 of the terminal equipment 11 can be restored by the first data converter 7 of the host computer 1 and the data converted by the second converter 16 of the terminal equipment 11 also can be restored by the second converter 8 of the host computer 1.

Now, the process to transmit the message M1 generated by the host computer 1 to the terminal equipment 11 via the communication interfaces 4 and 14 is first explained. In step ST1, the CPU 2 of the host computer 1 obtains the transaction key data KEY1' (=E1 K1 (KEY1)) through the data conversion (the data scramble) of the message deciphering key (transaction key), which is used in the first transaction, by the data converting function E1 of the first data converter 7 using the key data K1.

Here, the transaction key data KEY1 and the key data K1 have been stored in the memory 3 in advance. Hereafter, the host compute 1 transmits the transaction key data KEY1' to the terminal equipment 11. Upon receipt of the transaction key data KEY1', the CPU 12 of the terminal equipment 11 converts and deciphered the transaction key data KEY1' to get the transaction key data KEY1 (=D1 K1 (KEY1')) by the data converting function D1 in the first data converter 16 provided corresponding to the first data converter ? of the host computer 1 using the key data K1 and stores the transaction key data KEY1 in the memory 13.

Next, in the step ST2 the CPU 2 of the host computer 1 converts (enciphers) the message M1, which is generated by the CPU 2 itself, by the data converting function E1 in the data converter, for instance, in the CBC (Cipher Block Chaining) mode using the transaction key data KEY1 to get the message M1' (=E1 (CBC) KEY1 (M1)). Thereafter, the host computer 1 transmits the message M1' to the terminal equipment 11. Upon receipt of the message M1', the terminal equipment 11 performs the data conversion process to decipher the message M1' to get the message M1 (=D1 (CBC) KEY1 (M1')) by the data converting function D1 in the first data converter 15 in the CBC mode based on the transaction key data KEY1 held in the memory 13 in the step ST1. The message generated by the host computer 1 can be transmitted to the terminal equipment 11 by the process described above.

Next, the process to transmit the message generated by the terminal equipment 11 to the host computer 1 is explained. In the step ST3 the CPU 2 of the host computer 1 converts (data scramble) the transaction key data KEY2 to be used for data conversion of the message generated by the terminal equipment and transmits as the transaction key data KEY2' to the terminal equipment 11. The transaction key data KEY2 and the key data K2 referred to here have been stored in the memory 3 in advance. The terminal equipment 11 gets the transaction key data KEY2 in the same procedure as in the step ST1. In the step ST4 the CPU 12 of the terminal equipment 11 enciphers the message M2 through the data conversion process by the data converting function E2 in the second data converter 16 using the transaction key data KEY2 stored in the memory 13 in the step ST3 to get the message M2' (=E2 (CBC) KEY2 (M2)) and transmits the message M2' to the host computer 1.

Upon receipt of the message M2' from the terminal equipment 11, the host computer 1 deciphers the message M2' to get the message M2 (=D2 (CBC) KEY2 (M2')) through the data conversion process by the data converting function D2 of the second data converter 8 based on the transaction key data KEY2. The message generated by the terminal equipment 11 can be transmitted to the host computer 1 by the process described above.

In Case I described above, the key described above, the key data K1 and K2 used in the data conversion of the transaction key data KEY1 and KEY2 have been stored in advance in the memory 13 of the terminal equipment 11. The terminal equipment 11 is provided with the program to select a key data by the signal transmitted from the host computer and key data which is used by the CPU 12 is selected by this program. In the step ST1, the CPU 2 of the host computer 1 Transmits a specifier to specify the key data K1 together with the transaction key data KEY1' The CPU 12 of the terminal equipment 11 gets the key data K1 by referring to this specifier. In the step ST3, the key data K2 is obtained in the similar manner.

The key data K1 and K2 for the data conversion of the transaction key may be the same. Further, the transaction key used in the previous data communication may be used as the key data for the data conversion (enciphering/deciphering) of the transaction key to be used this time. That is, in the above Case I, the transaction key data KEY1 in the step ST1 may be used as the key data K2 in the step ST3.

Case II shown in FIG. 2 shows the flow of the data communication in the case where, on a system including the host computer 1 and the terminal equipment 11, the host computer 1 and the terminal equipment 11 are provided with the data converters 9 and 17 having the mutually corresponding data converting functions, and the data converted by the data converter 9 of the host computer 1 is restored by the data converter 17 of the terminal equipment 11 and the data converted by the data converter 17 is restored by the data converter 9 of the host computer 1. The explanation of the system configuration of Case II (see FIG. 7) is omitted here as it is almost the same as that of the system in Case I, above.

Each of the data converters 9 and 17 operates as either of an encipher and a decipher. That is, the data converters 9 and 17 can be called as an encipher/decipher or a decipher/encipher. An encipher function E and a decipher function D are generally related to each other with an inverse relation between them. The encipher function E and the decipher function D satisfy conditions given in following equations in the CBC mode.

$$E(CBC)\ KEYi\ (Mi) = Mi'$$

$$D(CBC)\ KEYi\ (Mi') = D(CBC)\ KEYi\ (E(CBC)\ KEYi\ (Mi)) = Mi$$

When the functions E and D are inversely operated, the same results are obtained as shown by following equations.

$$D(CBC) \, KEYj \, (Mj) = Mj'$$

$$E(CBC) \, KEYj \, (Mj') = E(CBC) \, KEYj \, (D(CBC) \, KEYj \, (Mj)) = Mj$$

As being easily understood from the above description, the data converters 9 and 17 are able to operate either of the encipher and the decipher without specific programs or hardwares.

Now, the process to transmit the message generated by the host computer 1 to the terminal equipment is first explained. In the step ST5, the CPU 2 of the host computer 1 gets the transaction key data KEY3' (=DK3 (KEY)) through the data conversion (the data scramble) of the transaction key data KEY3 by the data converting function D in the data converter 9 based on the key data K3 and transmits the transaction key data KEY3' to the terminal equipment 11. The transaction key data KEY3 and the key data K1 referred to here have been stored in the memory 3 in advance. Upon receipt of the transaction key data KEY3', the CPU 12 of the terminal equipment 11 converts (deciphers) the transaction key data KEY3' by the data converting function E in the data converter 17 using the key data K3 as the key to get the transaction key data KEY3 (=KEY3') and store it in the memory 13.

Then, in the step ST6 the CPU 2 of the host computer 1 converts (enciphers) the message M3 that was generated by the CPU 2 itself using the data converting function D in the data converter 9 based on the transaction key data KEY3 to get M3' (=D (CBC) KEY3 (M3)) and transmit the message M3' to the terminal equipment 11.

Upon receipt of the message M3', the CPU 12 of the terminal equipment 11 restores the message M3' by the data converting function E in the data converter 17 based on the transaction key data KEY3 that has been stored in the step ST5 and gets a message M3 (=E (CBC) KEY3 (M3')). The message generated by the host computer 1 can be transmitted to the terminal equipment 11 by the process described above.

Next, the process to transmit a message generated by The terminal equipment 11 to the host computer 1 is explained. First, in the step ST7 the CPU 2 of the host computer 1 transmits the transaction key data KEY4 which is to be used in the next step ST8 to the terminal equipment 11 using the key data K4 in the same procedure as in the above step ST5. The transaction key data KEY4 and the key data K4 referred to here have been stored in the memory 3 in advance.

Then, in the step ST8 the CPU 12 of the terminal equipment 11 converts (enciphers) the message M4 generated by itself by the data converting function E in the data converter 17 based on the transaction key data KEY4 which has been stored in the step ST7 to get a message M4' (=E (CBC) KEY4 (M4)) and transmits the message M4' to the host computer 1. Upon receipt of the message M4', the host computer 1 deciphers the message M4' through the data conversion using the data converting function D of the data converter 9 based on the transaction key data KEY4 to get a message M4 (=D (CBC) KEY4 (M4')) and thus, the message M4 generated by the terminal equipment 11 can be transmitted to the host computer 1.

Figure 9:
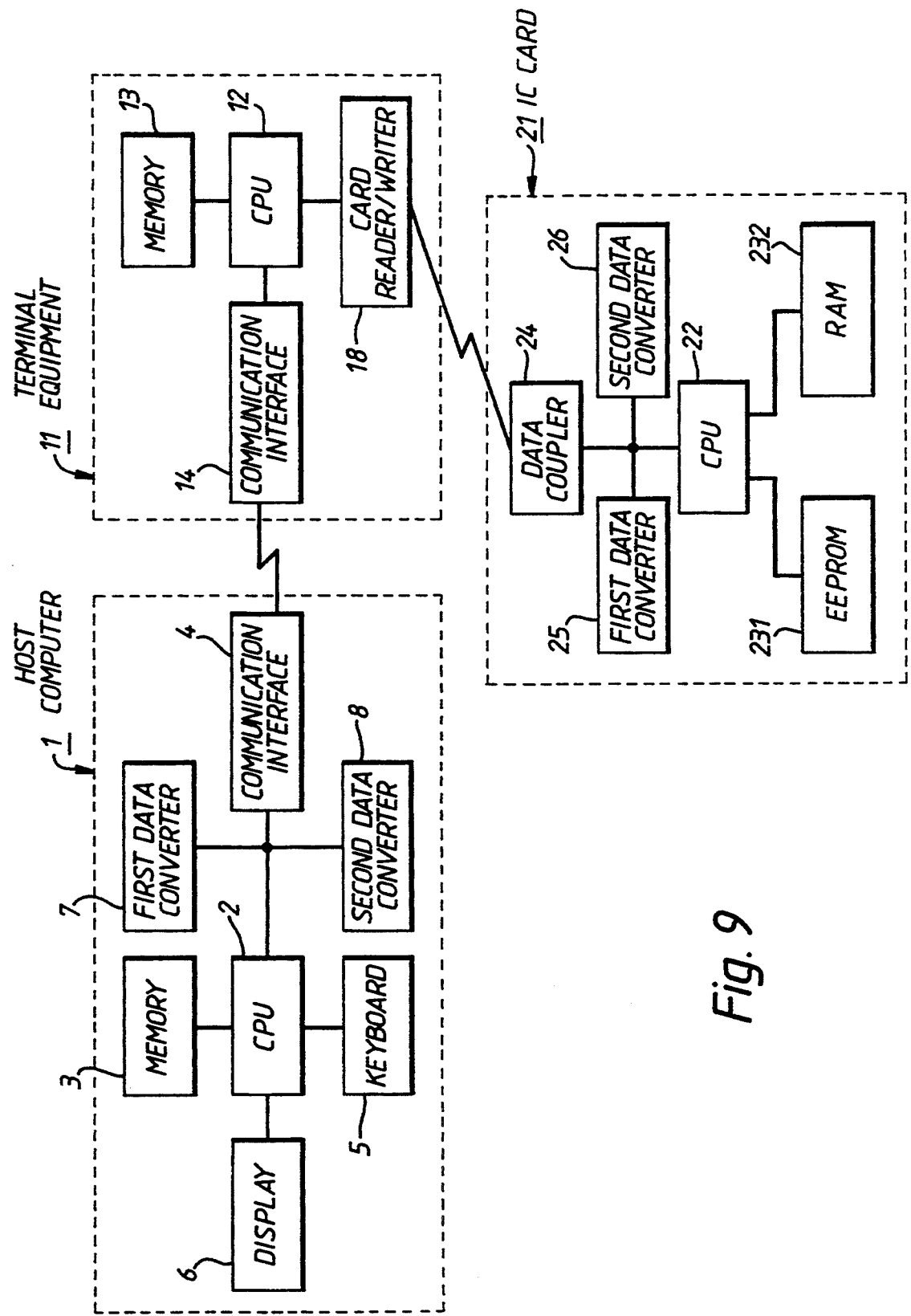
FIG. 9 is a block diagram of the system including the host computer, the terminal equipment and the IC card and of which the host computer and the IC card have two sets of data converters.

Case III shown in FIG. 3 shows the flow of the data communication on a system including the host computer 1, the terminal equipment 11 and the IC card 21 as shown in FIG. 9 in a case where the data conversion process (the enciphering/deciphering process) which was performed by the terminal equipment 11 in Case I is entrusted to the IC card 21 inserted in the terminal equipment 11.

The host computer 1, in this case, includes the CPU 2 which controls the operations of the components, the memory 3 which stores various information, the communication interface 4 which communicates with the terminal equipment, the keyboard 5 which is used by user for inputing data, commands, etc., the display 6 which is composed of, for instance, a CRT to display results of operations, communicated information, etc., the first data converter 7 having the data converting function E1 and the second converter 8 having the data converting function D2.

Further, the terminal equipment 11 includes the CPU 12 which controls the operations of the component of the terminal equipment 11, the memory 13 which stores various information, the communication interface 14 which communicates with the host computer 1 and a card reader/writer 18 which reads/writes data to/from the IC card 21.

The IC card 21 includes the CPU 22 to control the operation of the components of the IC card, the non-volatile memory 231 such as an EEPROM to store key data and various information (hereinafter referred to as EEPROM), the volatile memory 232 such as a RAM, etc. to store the transaction key (hereinafter referred to as RAM), a data coupler 24 to electrically connect with the card reader/writer 18 of the terminal equipment 11, the first data converter 25 having the data converting function D1 corresponding to the data converting function E1 of the data converter 7 of the host computer, and the second data converter 26 having the data converting function E2 corresponding to the data converting function D2 of the data converter of the host equipment 1.

Here, the data converted by, for instance, the first data converter 7 of the host computer 1 is restored by the first data converter 25 of the IC card 21 and the data converted by the second data converter 8 of the host computer 1 is restored by the second data converter 26 of the IC card 21.

Inversely, the data converted by the first data converter 25 of the IC card 21 can be restored by the first data converter 7 of the host computer 1 and the data converted by the second data converter 26 of the IC card 21 can be restored by the second data converter 8 of the host computer 1. Now, the state inside the EEPROM 231 of the IC card 21 is explained referring to the memory map shown in FIG. 11A.

The EEPROM 231 is divided into five sections, i.e., a directory position defining information storage area 30, a key area position defining information storage area (key area directory) 31, a data area defining information storage area (data area directory) 32, a data area 33, and a key area 34. In the directory position defining information storage area 30, the position of the key area directory 31 and that of the data area directory 32 are stored.

Figure 11A:
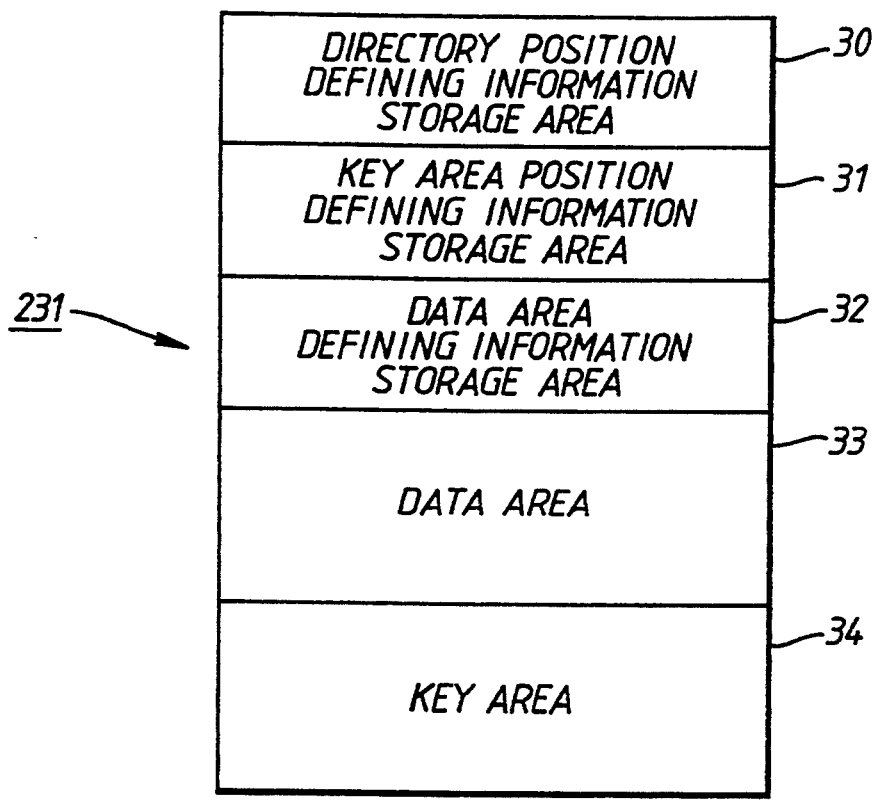
FIGS. 11A, 11B and 11C are diagrams showing a memory map of the IC card.
Figure 11B:

In the key area directory 31, one or more key area position defining information as seen in FIG. 11B are stored. This key area position defining information includes the key specifier, key area head address and key size. When the specifier is specified by a command described later, the key area head address and key size are recognized.

Figure 11C:

Further, in the data area directory 32, one or more data area position defining information as seen in FIG. 11C are stored. The data area position defining information includes the area specifier, area head address and area size and is used in the same manner as the key area directory described above. Further, such data as messages, etc. are stored in the data area 33 and key data are stored in the key area 34.

Here, the process to transmit a message generated by the host computer 1 to the terminal equipment 11 is explained. First, in the step ST9 the CPU 2 of the host computer 1 converts the transaction key data KEY5 (data scramble) by the data converting function E1 of the first data converter 7 based on the key data K5 to get a transaction key data KEY5' (=E1 K5 (KEY5)) and transmits it to the terminal equipment 11.

The transaction key data KEY5 and K5 referred to here have been stored in the memory 3 in advance. Upon receipt of the transaction key data KEY5' the CPU 12 of the terminal equipment 11 transmits a command A having a format as shown in FIG. 12A to the CPU 22 of the IC card 21. This command A includes a function code to direct the operation to decipher the transmitted enciphered transaction key, the specifier to specify the key data to be used when performing the data conversion in the IC card 21 and the transaction key data KEY5' transmitted to the terminal equipment 11 previously from the host computer 1.

Upon receipt of the command A, the CPU 22 of the IC card 21, judging the transmission of the transaction key from the function code, finds out the key data K5 specified by the above specifier from the EEPROM 231 and gets a transaction key data KEY5 (=DK5 (KEY5')) by performing the data conversion (deciphering) by the data converting junction D1 in the first data converter 25 using the specified key data K5, and transmits a response a to the command A, which has a format as shown in FIG. 12B to the CPU 12 of the terminal equipment 11. The response a includes the function code, the status showing the normal completion, and the transaction key data KEY5 obtained through the deciphering by the data conversion process.

Figure 19:
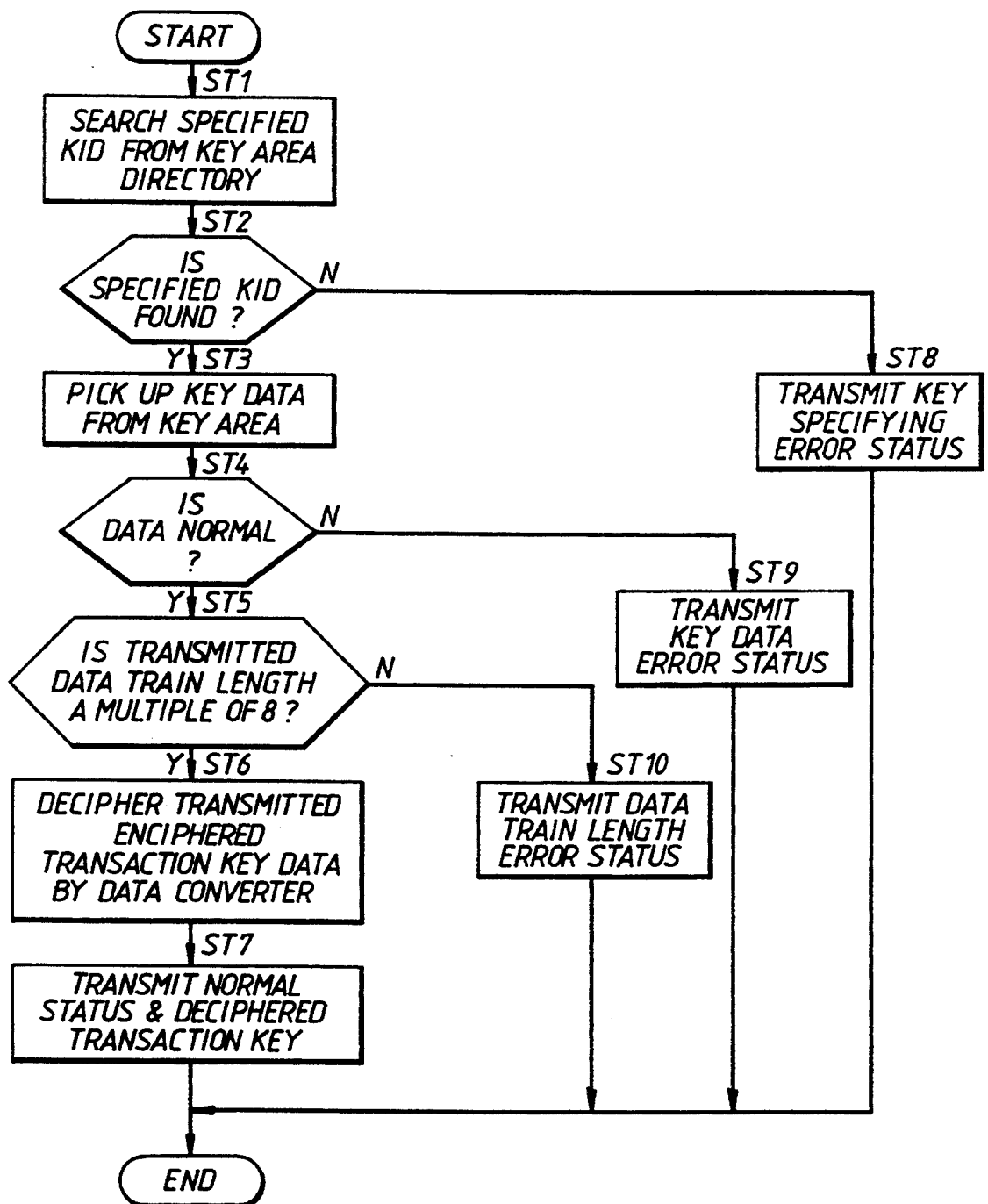

Now, the flow of the process operation of the CPU 22 of the IC card 21 using the command A and the response a in the communication between the terminal equipment 11 and the IC card 21 is explained referring to FIG. 19. First, when the command A is transmitted to the IC card 21 from the terminal equipment 11, the CPU 22 of the IC card 21 judges the transmission of a KID (Key Data No.) of the key specifier of the command A from the key area directory 31 of the EEPROM 231 (step ST1).

Then, the CPU 22 judges if the specified KID has been found (step ST2). When the KID has been found, it picks up the key data corresponding to the KID from the key area 33 of the memory 23 (step ST3). If the specified KID was not found in the above step ST2, the key specification error status is output as the response a (step ST8) and the process is terminated. After picking up the key data from the key area in step ST3, the key data is judged if it has any abnormality (step ST4).

When no abnormality has been found in the data picked up, it is judged if the data train length of the enciphered transaction key data transmitted by the command A is a multiple of 8 (step ST5). If no abnormality is in the data train length, after the data conversion (enciphering) by the data converter 25 using the key data that picked up the data train (KEY5') transmitted from the terminal equipment by the Command A (step ST6), the normal end status and the deciphered data train (KEY5) are transmitted to the terminal equipment 11 as the response a (step ST7) and the process is terminated.

If there is any abnormality in the key data in the above step ST4, the key data error status is output as the response a (step ST9) and the process is terminated. Further, when the data train length of the data transmitted is not a multiple of 8, the data train length error status is output as the response a (step ST10) and the process is terminated.

Next, the CPU 12 of the terminal equipment 11 transmits a command B which has a format as shown in FIG. 13A to the CPU 22 of the IC card 21. This command B includes a function code which directs the operation to store the transmitted transaction key in the RAM 232 and the transaction key data KEY5 which has been transmitted previously to the terminal equipment 11 to the IC card 21. Upon receipt of this command B, the CPU 22 of the IC card 21 stores the transaction key data KEY5 transmitted by the command B in the RAM 232.

Thereafter, the CPU 22 of the IC card 21 transmits a response b which has a format as shown in FIG. 13B. This response b includes the function code showing the response to the command B and the status showing the normal completion. At this time, the CPU 12 of the terminal equipment 11, after transmitting the command B to the IC card 21 again, erases the transaction key data KEY5 previously received from the IC card 21 and stored in the memory 13.

Figure 20:
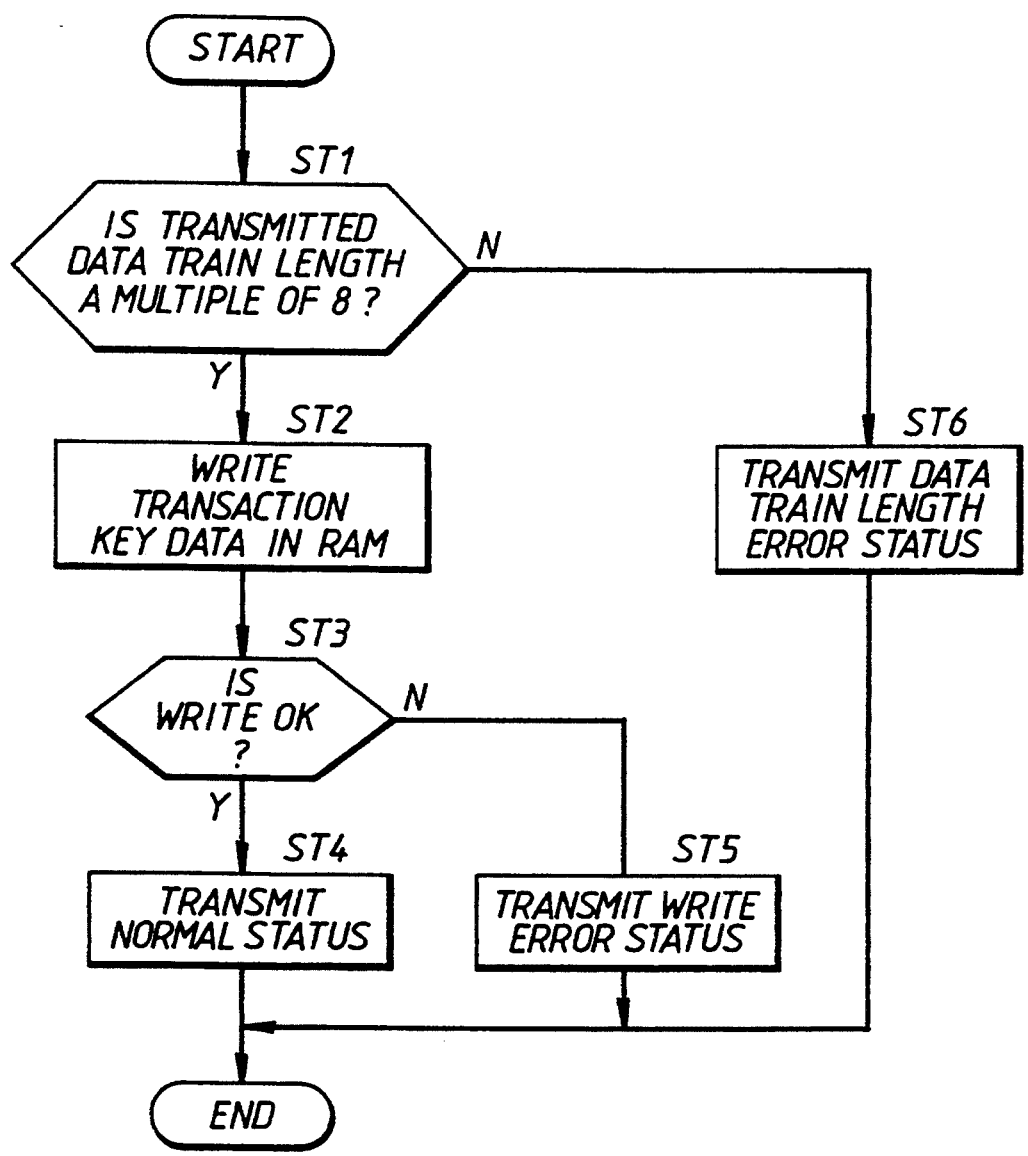
FIG. 20 is a flow chart showing a communication process by using the command B and the response b.

Now, the flow of process operation of the CPU 22 of the IC card 21 in the communication between the terminal equipment 11 and the IC card 21 using the command B and the response b is explained referring to FIG. 20. When the command B is transmitted from the terminal equipment 11, this transmitted data train (KEY5) length is checked if it is a multiple of 8 (step ST1). When the data train length is a multiple of 8, the CPU 22 of the IC card 21 writes the data train (KEY5) in the specified area of the RAM 232 (step ST2).

Then, it is checked whether the transaction key data (KEY5) has been properly written (step ST3). When the data has been properly written, the normally completed status is output to the terminal equipment 11 as the response b (step ST4) and the process is terminated. If the data was not properly written in step ST2, the write error status is output as the response b (step ST5) and the process is terminated. If the input data length in step ST1 was not a multiple of 8, the data train length error status is output as the response b and the process is terminated (step ST6).

Next, in the step ST10 the CPU 2 of the host computer 1 performs the data conversion (enciphering) of the message M5, which has been generated by the CPU 2 itself, to get a message MS' (=E1 (CBC) KEY5 (MS)) by the data converting function E1 in the first data converter 7 in the CBC mode based on the transaction key data KEY5 and transmits the message M5' to the terminal equipment 11.

Upon receipt of the message M5', the CPU 12 of the terminal equipment 11 transmits it to the IC card 21 using a command C which has a format as shown in FIG. 14A. The command C includes a function code to direct the deciphering operation of the transmitted enciphered message, the specifier to specify the key data to be used in the IC card 21 in the data conversion process, and the message M5' which has previously transmitted to the terminal equipment 11 from the host computer 1. In the example shown in FIG. 3, the transaction key (KEY5) stored in the RAM 232 is specified by the command B.

Now, upon receipt of the command C, the CPU 22 of the IC card 21 deciphers the message M5' by the data converting function D1 in the first data converter 25 using the key data KEY5 sepcified by the specifier described above to get a message M5 (D=E1 (CBC) KEY5 (M5')) and as the response to the command C, transmits a response c having a format as shown in FIG. 14B to the CPU 12 of the terminal equipment 11. The response c includes a function code showing the response to the command C, the status showing the normal completion, and the message M5 which has been deciphered and obtained by the data conversion process. Now, the terminal equipment 11 is able to receive the message from the host computer 1.

Figure 21:
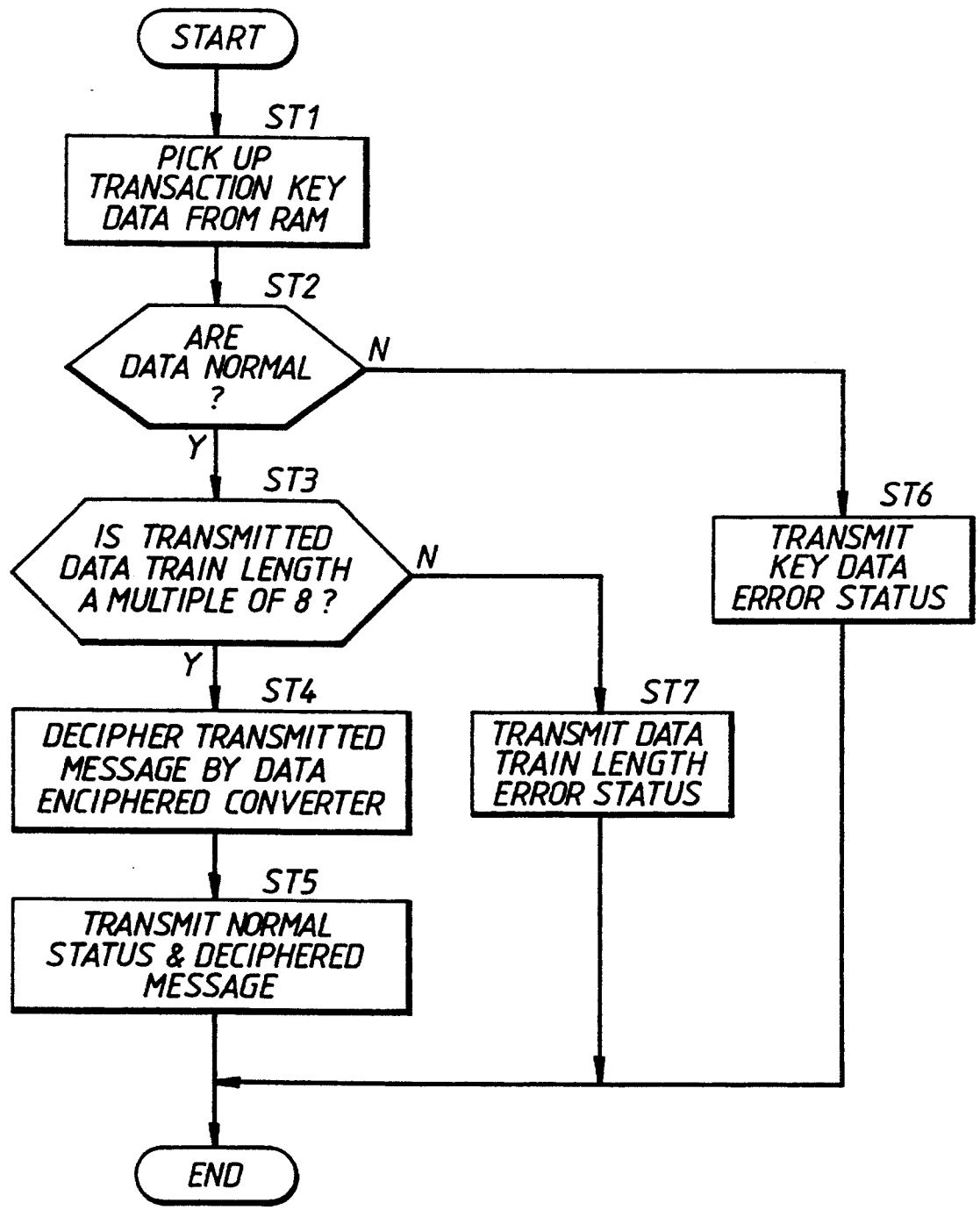
FIG. 21 is a flow chart showing a communication process by using the command C and the response c.

Next the flow of the process operation of the CPU 22 of the IC card 21 in the communication using the command C and the response c between the terminal equipment 11 and The IC card 21 is explained referring to FIG. 21.

First, when the command C is transmitted from the terminal equipment 11, the CPU 22 of the IC card 21 picks up the key data (in this case, the transaction key data KEY5 transmitted by the command B immediately before) specified by this command C from the RAM 232 (step ST1). After picking up the transaction key data, the CPU 22 judges if this key data has any abnormality (step ST2). When no abnormality is picked up in the key data, the CPU 22 checks if the data train length of the data transmitted from the terminal equipment by the command C is a multiple of 8 (step ST3).

When the data train length is a multiple of 8, using the transaction key data KEY5 picked up in the above, the CPU 22 deciphers this data train (MS') by performing the data conversion by the first data converter 25 (step ST4) and outputs the normal completion status as the response c and the deciphered data train (MS) to the terminal equipment 11 (step ST5) and terminates the process.

Further, when an abnormality was found in the key data in the above step ST2, the data error status is output as the response c to the terminal equipment (step ST6) and the process is terminated. Further, when the data train length was not a multiple of 8 in the above step ST3, the data train length error status is output as the response c to the terminal equipment 11 (step ST7) and the process is terminated.

Next, the process to transmit a message generated in the terminal equipment to the host computer 1 is explained. First in the step ST11, the CPU 2 of the host computer 1 transmits the transaction key data KEY6 to be used by the IC card 21 in the next step ST12 to the terminal equipment 11 in the same procedures as in the above step ST9. The transaction key data KEY6 and the key data K6 have been stored in the memory 3 in advance. The explanation of the data communication process between the terminal equipment 11 and the IC card 21 using the command A, response a and the command B, response b is omitted as it has been already provided in the above step ST9. Upon receipt of the command B, the CPU 22 of the IC card 21 stores the transaction key data KEY6 transmitted by the command B in the RAM 232.

Next, in the step ST12 the CPU 12 of the terminal equipment transmits the message M6 that has been generated by the CPU 12 itself to the card 21 using a command D in a format as seen in FIG. 15A. The command D includes a function code which directs the enciphering of the transmitted message, the specifier which specifies the key tiara to be used for the data conversion process by the IC card 21 and the message M6. In the example shown in FIG. 3, the specifier specifies the transaction key data KEY6 which has been transmitted and stored in the RAM 232 by the command B in the step ST11.

Upon receipt of the command D, the CPU 22 of the IC card 21 performs the data conversion by the data converting function E2 in the second data converter 26 using the key data KEY6 specified by the specifier to encipher the message M6 and to get a message M6' (=M2 (CBC) KEY6 (M6)) and transmits a response d having a format as shown in FIG. 15B to the CPU 12 of the terminal equipment 11 as the response to the command D. The response d includes a function code showing the response to the command D, the status showing the normal completion and the enciphered message M6' obtained through the data conversion.

Upon receipt of the response d from the IC card 21, the CPU 12 of the terminal equipment 11 transmits the enciphered message M6' to the host computer 1. Upon receipt of the enciphered message M6', the CPU 2 of the host computer 1 enciphers the message M6' to get the message M6 (=D2 (CBC) KEY6 (M6')) by performing the data conversion by the data converting function D2 in the second data converter 8 using the transaction key data KEY6. The host computer 1 is able to receive the message from the terminal equipment 11 according to the procedure described above.

Figure 22:
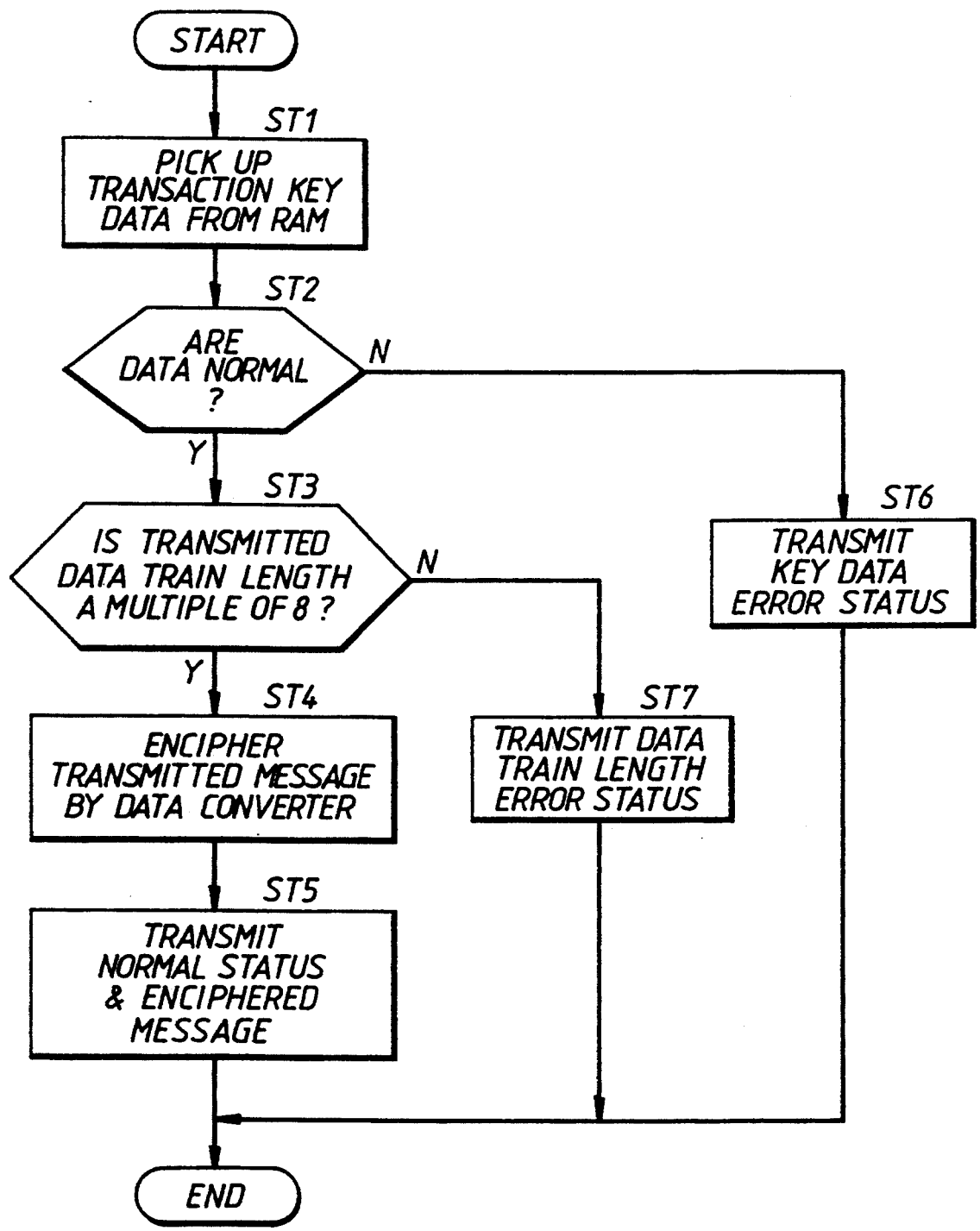
FIG. 22 is a flow chart showing a communication process by using the command D and the response d.

Now, the operation of the CPU 22 of the IC card 21 in the communication between the terminal equipment 11 and the IC card 21 using the command D and the response d is explained referring to FIG. 22.

First, when the command D is transmitted from the terminal equipment 11, the CPU 22 of the IC card 21 picks up the transaction key data KEY6 specified by the key specifier of this command D from the RAM 232 (step ST1). After picking up the transaction key data from the RAM 232, the CPU 22 judges if this transaction key data has abnormality in step ST1 (step ST2). If no abnormality is found in the picked up transaction key data, the CPU 22 judges whether the data train length (M6) transmitted from the terminal equipment 11 by the command D is a multiple of 8 (step ST3).

When the data train length is judged to be a multiple of 8, after enciphering the message M6 by performing the data conversion by the data converter using the picked up The transaction key data KEY6 (step ST4), the CPU 22 outputs The normal completion status and the enciphered data train (M6') to the terminal equipment 11 as the response d (step ST5) and terminates the process. If any abnormality was found in the key data in the above step ST2, the data error status is output as the response d (step ST6) and the process is terminated. Further, if the data train length was found to be not proper in the above step ST3, the data train length error status is output (step ST7) and the process is terminated.

Figure 10:
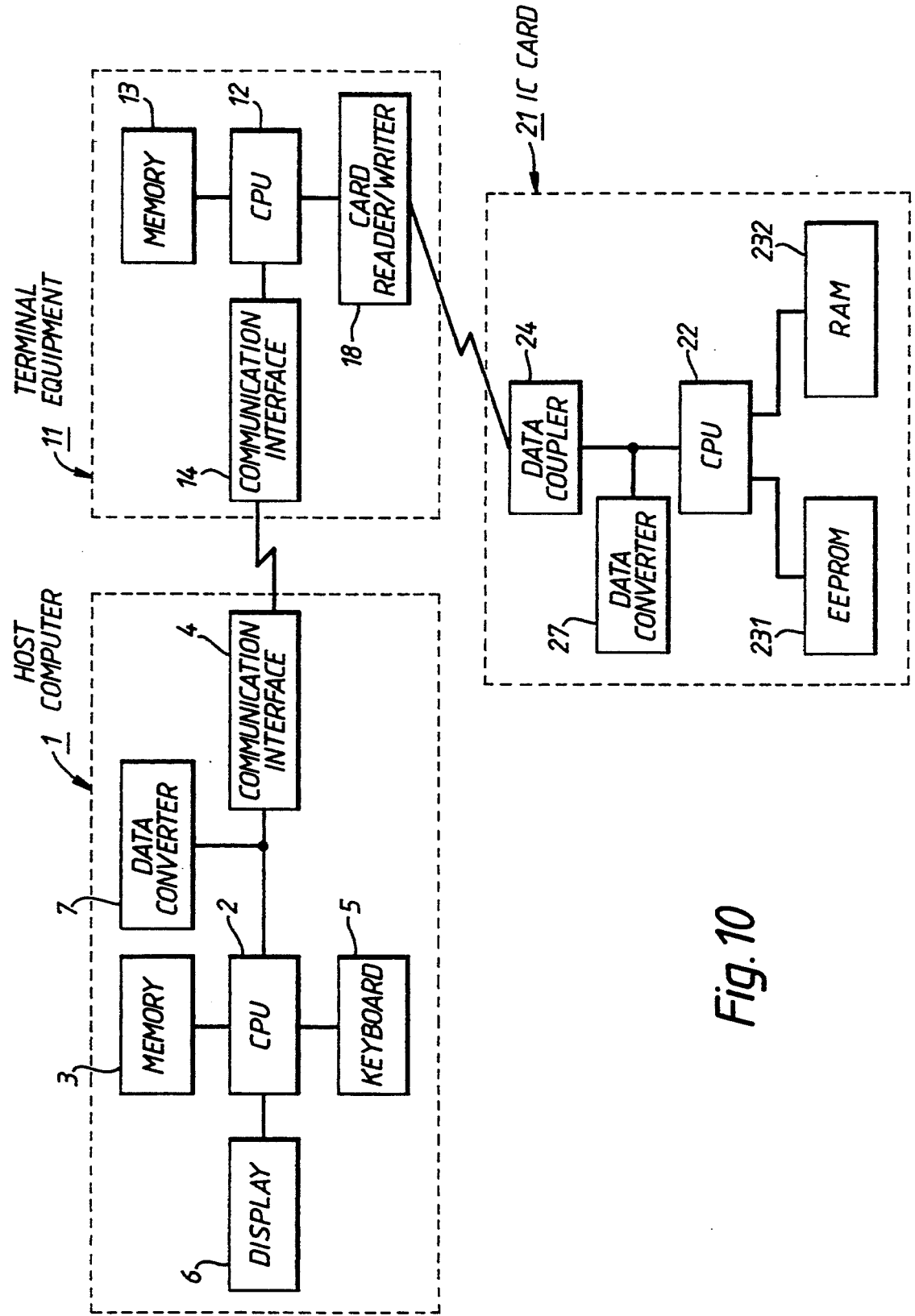
FIG. 10 is a block diagram of the system including the host computer, the terminal equipment and the IC card and of which the host computer and the IC card have one set of data converters.

Next, Case IV shown in FIG. 4 shows the data communication in a case where, on the system including the host computer 1, the terminal equipment 11 and the IC card 21 as shown in FIG. 10, the data conversion process which, was performed by the terminal equipment 11 in Case II is entrusted to the IC card 21 which is inserted in the terminal equipment 11.

First, the process to transmit a message generated by the host computer 1 to the terminal equipment 11 is explained. First, in the step ST13, the host computer 1 and the IC card 21 have the data converters 9 and 27, respectively, which have the mutually corresponding data converting functions and the flow of the data communication in a case where the data converted by the data converter 9 of the host computer 1 is restored by the data converter 27 of the IC card 21 and the data converted by the data converter 27 of the IC card 21 is restored by the data converter 9 of the host computer 1 is shown. Here, the system configuration of Case IV is omitted as it is almost the same as the system (see FIG. 9) shown in Case III.

Now, the process to transmit a message generated by the host computer 1 to the terminal equipment 11 is first explained. In the step ST13, the CPU 2 of the host computer performs the data conversion (the data scramble) of the transaction key data KEY7 by the data converting function D of the first data converter based on the key data K7 to get a transaction key data KEY7' (=DK7 (KEY7)) and transmits this transaction key data KEY7' to the terminal equipment 11. The transaction key data KEY7 and the key data K7 have been stored in the memory 3 in advance.

Upon receipt of the transaction key data KEY7', the CPU 12 of the terminal equipment 11 transmits a command E having a format as shown in FIG. 16A to the CPU 22 of the IC card 21. Here, the command E includes a function code which directs the deciphering operation of the received enciphered transaction key, the specifier which specifies the key data to be used for the data conversion process by the IC card 21, and the transaction key data KEY7' transmitted to the terminal equipment 11 from the host computer 1.

Now, upon receipt of the command E, the CPU 22 of the IC card 21 deciphers the transaction key data KEY7' to get a transaction key data KEY7 (=DK7 (KEY7')) by performing the data converting function E of the data converter 27 based on the key data K7 specified by the specifier, and transmits a response e having a format as shown in FIG. 16B to the CPU 12 of the terminal equipment 11. Here, the response e includes a function code showing the response to the command E, the status showing the normal completion and the deciphered transaction key data KEY7' obtained by the data conversion.

Figure 23:
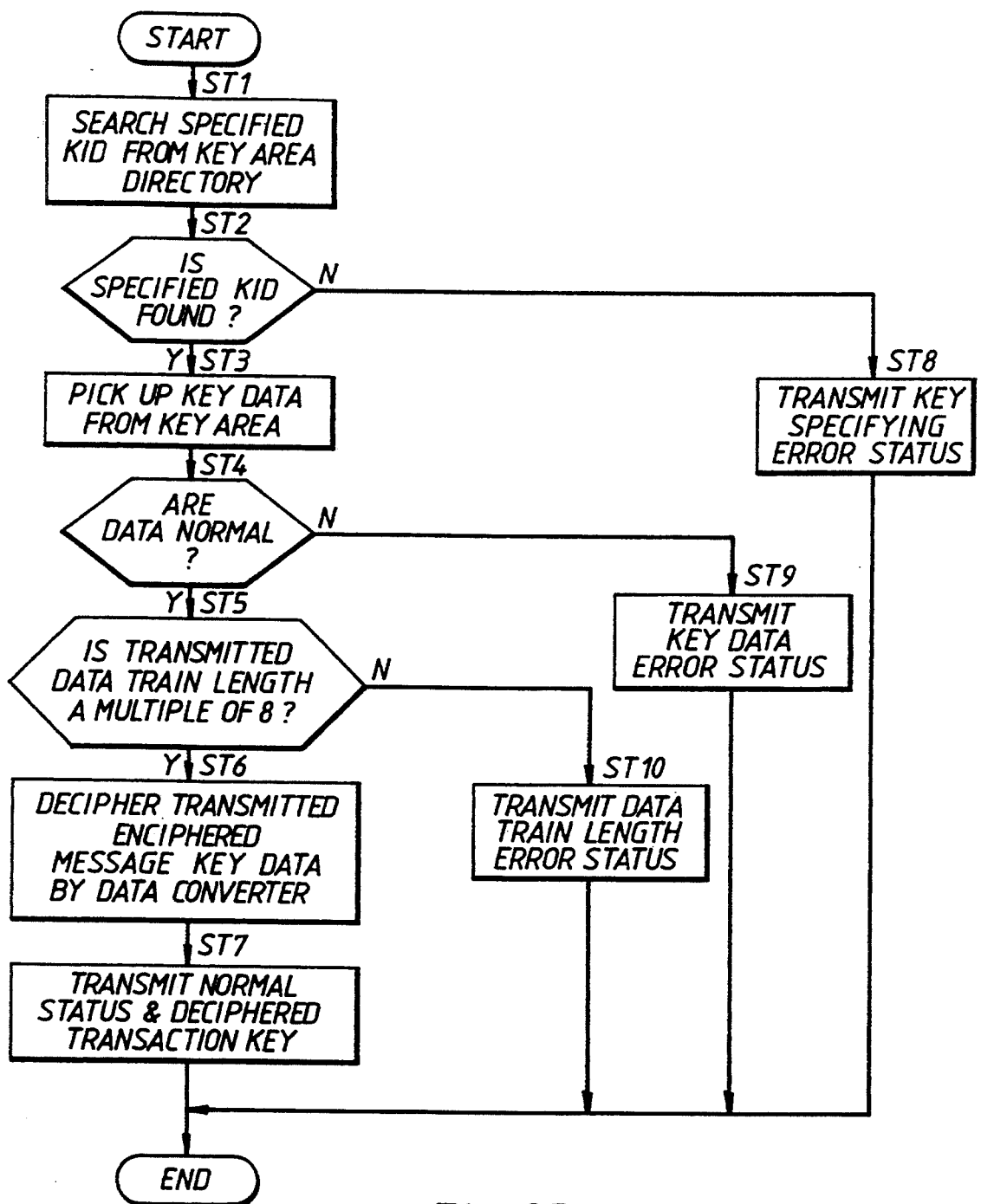
FIG. 23 is a flow chart showing a communication process by using the command E and the response e.

Then, the operation of the CPU 22 of the IC card 21 in the communication between the terminal equipment 11 and the IC card 21 using the command E and the response e is explained hereinafter referring to FIG. 23.

First, when the command E is transmitted from the terminal equipment 11, the CPU 22 of the IC card 21 retrieves the KID (Key Data No.) which is the value of the key specifier of the command E from the key area directory 31 in the EEPROM 231 (step ST1). Then, the CPU 22 judges if the specified KID is found (step ST2) and if the KID is found, picks up the key data corresponding to the KID from the key area 33 in the EEPROM 231 (step ST3). If the specified KID was not found in the above step ST2, the key specification error status is output as the response e and the process is terminated.

After picking up the key data from the key area in the step ST3, the CPU 22 judges if this key data is normal (step ST4) and if no abnormality was found in the data, judges if the data train length of the received enciphered transaction key data is a multiple 8 (step ST5). If the data train length is normal, the data conversion is performed by the data converter 27 using the above picked up key data and after obtaining the transaction key data KEY7 by deciphering the data train (KEY7') transmitted from the terminal equipment 11 by the command E (step ST6), the normal completion status and the deciphered transaction key data KEY7 are output to the terminal equipment 11 as the response e (step ST7) and the process is terminated.

When any abnormality was found in the data in the above step ST4, the data error status is output as the response e (step ST9) and the process is terminated. Further, when the data train length was not a multiple of 8 in the above step ST5, the data train length error status is output as the response e (step ST10) and the process is terminated.

Next, the CPU 12 of the terminal equipment 11 transmits the command B having the format as shown in FIG. 13A to the CPU 22 of the IC card 21. Here, the command includes the function code which directs the operation to store the transmitted transaction key in the RAM 232 and the transaction key data KEY7 which was previously transmitted to the terminal equipment 11 from the card 21. Upon receipt of this command B, the CPU 12 of the IC card 21 stores the transaction key data KEY7 transmitted by the command B in the RAM 232.

Hereinafter, the CPU 22 of the IC card 21 transmits the response b having the format as shown in FIG. 13B to the CPU 12 of the terminal equipment 11. The response b includes the function code showing the response to the command B described above and the status showing the normal completion. At this time, the CPU 12 of the terminal equipment 11 erases the transaction key data KEY7 previously received from the IC card 21 and stored in the memory 13 after retransmitting the command B to the IC card 21.

The flow of the process operation of the CPU 22 of the IC card 21 in the communication between the terminal equipment 11 and the IC card 21 using the command B and the response b is omitted here as it has been already explained referring to FIG. 20.

Next, in the step ST14 the CPU 2 of the host computer 1 converts (enciphers) the message M7, which is generated by the CPU 2, by the data converting function D of the data converter 9 in the CBC mode based on the transaction key data KEY7 to get the transaction key data M7' (=E (CBC) KEY (M7)) and transmits the message M7' to the terminal equipment 11. Upon receipt of the message M7', the CPU 12 of the terminal equipment 11 transmits the message M7' to the IC card 21 using the command C in the format as shown in FIG. 14A.

This command C includes the function code which directs the deciphering operation of the received enciphered message, the specifier which specifies the key data to be used in the data conversion by the IC card 21, and the enciphered message M7' previously transmitted to the terminal equipment 11 from the host computer 1. In the example shown in FIG. 4, the specifier specifies the transaction key data KEY7 stored in the RAM 232 by the command B in the step ST13.

Now, upon receipt of the command C, the CPU 222 of the IC card 21 executes the deciphering process by the data converter 27 using the transaction key data KEY7 specified by the specifier to get a message M7 (=D (CBC) K7 (M'7)) and transmits the response c in the format as shown in FIG. 14 to the CPU 12 of the terminal equipment 11. The response referred to here includes the function code showing the response to the command C, the status showing the normal completion, and the message M7 obtained by the enciphering process. Thus, the terminal equipment 11 is able to receive the message M7 from the host computer 1.

The explanation of the flow of the process operation of the CPU 22 of the IC card 21 in the communication between the terminal equipment 11 and the IC card 21 using the command C and the response c is omitted as it has been provided previously referring to FIG. 21.

Next, the process to transmit a message generated at the terminal equipment 11 to the host computer 1 is explained. First in the step ST15 the CPU 2 of the host computer 1 transmits the transaction key data KEY8 that is used by the IC card 21 in the next step ST16 to the terminal equipment using the key data K8 in the same procedure as in the above step ST13. The transaction key data KEY8 and the key data K8 referred to here have been stored in the memory, 3 in advance. The CPU 21 of the IC card 21, when receiving the command B, stores the transaction key data KEY8 transmitted by the command B in the RAM 232.

Then, in the step ST16 the CPU 12 of the terminal equipment 11 transmits the message M8 which is generated by the CPU 12 itself to the IC card 21 using the command D in the format as seen in FIG. 15A. The command D referred to here includes the function code which directs the enciphering operation of the transmitted message, the specifier which specifies the key data that is used in the data conversion in the IC card 21, and the message M8.

In the example shown in FIG. 4, the key (KEY8) converted by the command B in the step ST15 is specified. Hereinafter, the communication process is executed in the procedure reverse to that in the step ST14 and the message 8 generated by the terminal equipment 11 is transmitted to the host computer 1.

The explanation of the flow of the process operation of the CPU 22 of the IC card 21 in the communication between the terminal equipment and the IC card 21 using the command D and the response d is omitted here as it has been provided previously referring to FIG. 22.

Next, the case shown in FIG. 5 shows the embodiment in the case where, on the system including the host computer 1, terminal equipment 11 and the IC card 21, the function to retain the transaction key restored in the IC card 21 in the memory 13 of the terminal equipment 11 in Case III is changed to retain the transaction key of the RAM 232 in the IC card 21.

First, the process to transmit a message generated at the host computer 1 to the terminal equipment is explained. In the step ST17 the CPU 2 of the host computer 1 performs the data conversion (data scramble) of the transaction key data KEY9 by the data converting function E1 of the first data converter 7 using the key data K9 to get a transaction key data KEY9' (=E1 K9 (KEY9)) and transmit this transaction key data KEY9' to the terminal equipment 11. Here, the transaction key data KEY9 and the key data K9 have been stored in the memory 3 in advance.

Upon receipt of the transaction key data KEY9', the CPU 12 of the terminal equipment 11 transmits a command F in a format as shown in FIG. 17A to the CPU 22 of the IC card 21. Here, the command F includes a function code which directs the operation to decipher and store the received enciphered transaction key data in the RAM 232, the specifier which specifies the key data to be used in the data conversion in the IC card, and the transaction key data KEY9' previously transmitted to the terminal equipment 11 from the host computer 1.

Upon receipt of the command F, the CPU 22 of the IC card 21 performs the data conversion by the data converting function D1 of the first data converter using the key data K9 specified by the specifier and by deciphering the transaction key data KEY9', gets a transaction key data KEY9 (=D1 K9 (KEY9')) and transmits a response f in a format as shown in FIG. 17B to the CPU 12 of the terminal equipment 11 as the response to the command F. The response f includes a function code showing the response to the command F and the status showing the normal completion.

Figure 24:
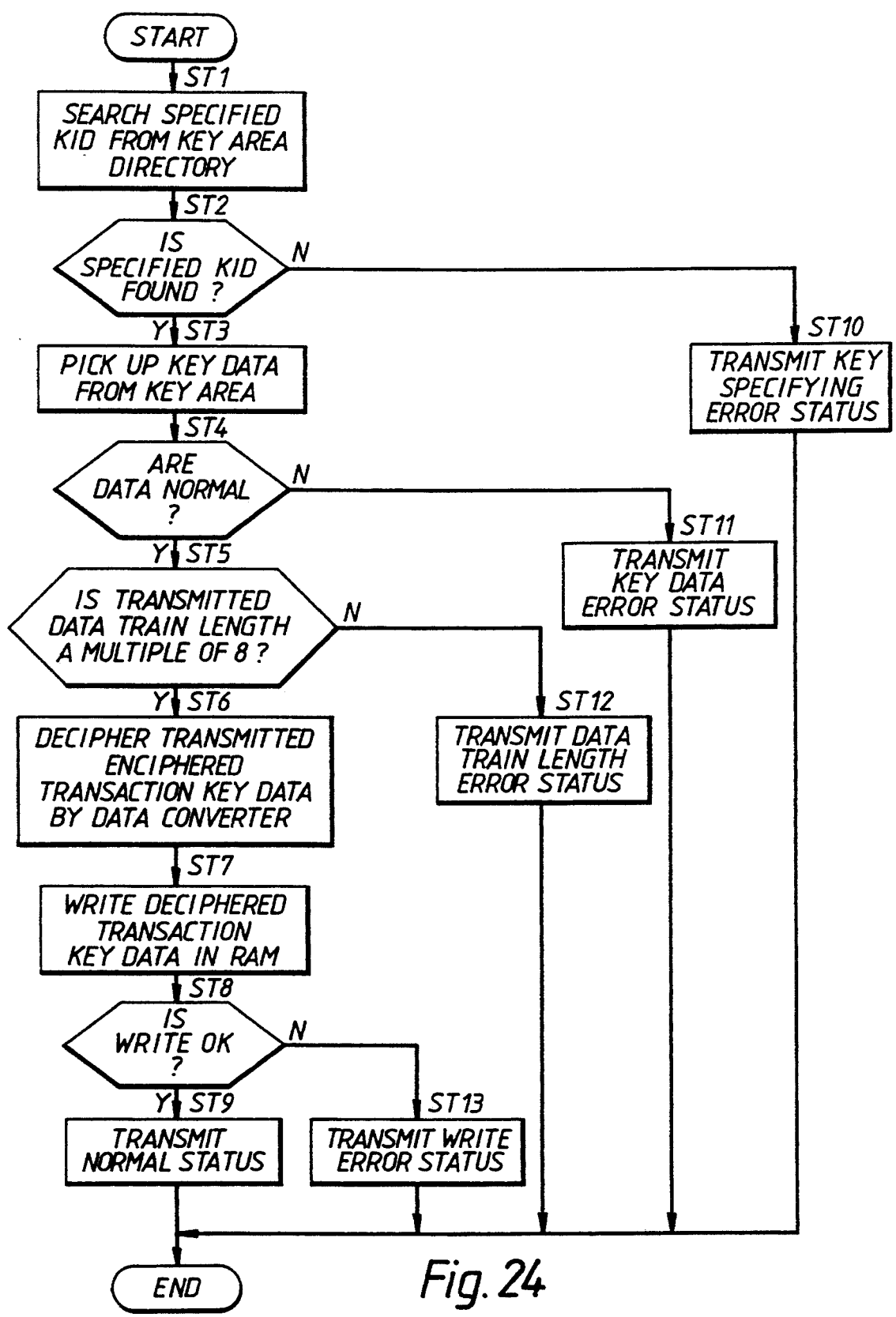
FIG. 24 is a flow chart showing a communication process by using the command F and the response

Now, the flow of the process operation of the CPU 22 of the IC card 21 in the communication between the terminal equipment 11 and the IC card 21 using the command F and the response f is explained referring to FIG. 24. First, when the command F is transmitted from the terminal equipment 11, the CPU 22 of the IC card 21 retrieves the KID (Key Data No.) that is the value of the key specifier of this command F from the key area directory 31 in the EEPROM 231 (step ST1) and judges whether the specified KID has been found (step ST2). When the KID has been found, the CPU 22 picks up the key data corresponding to the KID from the key area 33 in the memory 23 (step ST3).

If the specified KID was not found in the step ST2, the CPU 22 outputs the key specifying error status t as the response f (step ST9) and terminates the process. After picking up the key data from the key area in the step ST3, the CPU 22 judges whether this key data has abnormality (step ST4) and if no abnormality is found in the key data, judges whether the data train length of the received enciphered transaction key data is a multiple of 8 (step ST5).

When the data train length of the received data is normal, after the data conversion (deciphering) of the data train transmitted from the terminal equipment 11 by the first data converter 25 using the picked up key data (step ST6), the CPU 22 writes the deciphered transaction key data KEY9 in the RAM 232 (step ST7) and judges whether the deciphered transaction key data KEY9 has been properly written (step ST8). When it has been properly written, the normal completion status is output as the response f (step ST9) and the process is terminated.

On the other hand, if the write was not properly made in the step ST5, the write error status is output as the response f (step ST9) and the process is terminated. If an abnormality was found in the key data in the above step ST4, the data error status is output as the response f (step ST11) and the process is terminated. Further, when the data train length was not a multiple of 8 (the data train length was not proper) in the above step ST5, the data train length error status is output as the response f (step ST12) and the process is terminated.

Next, in the step ST18 the CPU 12 of the terminal equipment 11 transmits the command C in the format as shown in FIG. 14A to the CPU 22 of the IC card 21.

This command C includes the function code which directs the deciphering operation of the received enciphered message, the specifier which specifies the key data, and the enciphered message M9′ previously transmitted to the terminal equipment 11 from the host computer 1.

Upon receipt of this command C, the CPU 22 of the IC card 21 transmits the message M9 generated in the host computer 1 to the terminal equipment 11 in the same procedure as in Case III in the step ST3. The explanation of this procedure is omitted here as it has been already described in the above.

Next, the process to transmit a message generated at the terminal equipment 11 to the host computer 1 is explained. First, in the step ST19 the CPU 2 of the host computer 1 transmits the transaction key data KEY10 to be used by the IC card 21 in the next step ST20 to the terminal equipment 11 using the key data K10 in the same procedure as in the above step ST17. The transaction key data KEY10 and the key data K10 referred to here have been stored in the memory 3 in advance. Upon receipt of the command F from the terminal equipment 11, the CPU 12 of the IC card 21 stores The transaction key data KEY 10 transmitted by the command F in the RAM 232.

Next, in the step ST20 the CPU 12 of the terminal equipment 11 transmits the message M10 generated by the CPU 12 itself to the IC card 21 using the command D in the format as seen in FIG. 15A. Here, the command D includes the function code which directs the enciphering operation of the message to be transmitted, the specifier which specifies the key data to be used for the data conversion in the IC card 21, and the message M6.

In the example shown in FIG. 5, the specifier specifies the transaction key data KEY10 that was transmitted by the command F in the step ST19. Upon receipt of this command D, the CPU 21 of the IC card 21 transmits the message M10 generated in the terminal equipment 11 to the host computer 1 in the same procedure as in Case III shown in the step ST12. The explanation of this procedure is omitted there as it has been described in Case III.

Next, Case VI shown in FIG. 6 shows the embodiment where the transaction key data restored in the IC Card 21 and retained in the memory 13 in Case IV is changed to be retained in the RAM 232 of the IC card 21 on the system including the host computer 1, the terminal equipment 11 and the IC card 21.

First, the process to transmit a message generated at the host computer 1 to the terminal equipment 11 is explained. In the step ST21, the CPU 2 of The host computer 1 performs the data conversion (the data scramble) of the transaction key data KEY11 by the data converting function d of the data converter 9 based on the key data K11 to get a transaction key data KEY11′ (=DK11 (KEY11)) and transmits the transaction key data key11′ to the terminal equipment 11. Here, the transaction key data KEY11 and the key data K11 have been stored in the memory 3 in advance.

Upon receipt of the transaction key data KEY11′, the CPU 12 of the terminal equipment 11 transmits a command G having a format as shown in FIG. 18A to the CPU 22 of the IC card 21. The command G includes a function code which directs the operation to decipher the enciphered transaction key received and store it in the RAM 232, the key specifier which specifies the key data to be used by the IC card 21 for the data conversion process, and the transaction key data KEY11′ previously transmitted to the terminal equipment 11 from the host computer 1.

Now, upon receipt of the command G, the CPU 22 of the IC card 21 converts and deciphers the transaction key data KEY11′ to get a transaction key data KEY11 (=DK11 (KEY11′)) by the data conversion function E of the data converter 27 using the key data K11 specified by the specifier described above, and transmits a response g having a format as shown in FIG. 18B to the CPU 12 of the terminal equipment 11 as the response to the command G. Here, the response g includes a function code showing the response to the command g and the status showing the normal completion.

Here, the flow of operation of the CPU 22 of the IC card 21 in the communication between the terminal equipment and the IC card 21 using the command G and the response g is explained referring to FIG. 24.

First, when the command G is transmitted from the terminal equipment 11, the CPU 22 of the IC card 21 retrieves the KID (key Data No.) which is the value of the key specifier of this command G from the key area directory 31 in the EEPROM 231 (step ST1) and judges whether the specified KID has been found (step ST2). When the KID has been found, the CPU 22 picks up the key data K3 in the memory 23 (step ST3).

When the specified KID was not found in the step ST2, the key specifying error status is output as the response g (step ST9) and the process is terminated. After picking up the key data from the key area in the step ST3, the CPU 22 judges whether this key data is proper (step ST4) and if the key data is proper, the CPU 22 judges if the data train length of the received enciphered transaction key data is a multiple of 8 (step ST5).

When no abnormality is found in the data train length, the data train transmitted from the terminal equipment 11 by the command G is converted (deciphered) by the first data converter 25 using the key data picked up as described above (step ST6) and then, the deciphered transaction key data KEY9 is written in the RAM 232 (step ST7). And, the CPU 22 judges whether the writing has been properly made (step ST8) and when it has been properly made, outputs the normal completion status as the response g (step ST9) and terminates the process.

On the other hand, when the write was not properly made in the step ST8, the write error status is output as the response g (step ST13) and the process is terminated. When any abnormality was found in the key data in the above step ST4, the data error status is output as the response g (step ST11) and the process is terminated. Further, when the data train length was not a multiple of 8 in the above step ST5, the data train length error status is output as the response g (step ST12) and the process is terminated.

Next, in the step ST22 the CPU 12 of the terminal equipment 11 transmits the command C in the format as shown in FIG. 14A to the CPU 22 of the IC card 21. Here, the command C includes the function code which directs the deciphering of the enciphered message transmitted and the specifier which specifies the key data. Upon receipt of this command G, the CPU 22 of the IC card 21 transmits the message M11 generated in the host computer 1 to the terminal equipment in the same procedure as in the step ST14 in the case described above. The explanation of this procedure is omitted here as it has been already described in the above.

Next, the process to transmit a message generated in the terminal equipment 11 to the host computer 1 is explained. First, in the step ST23 the CPU 2 of the host computer 1 transmits the transaction key data KEY 12 which is used in the IC card 21 in the next step ST24 to the terminal equipment 11 using the key data K12 in the same procedure as in the above step ST21. Here, the transaction key data KEY 12 and the key data K12 have been stored in the memory 3 in advance. When receiving the command G, the CPU 12 of the IC card 21 stores the transaction key data KEY 22 transmitted by the command G in the RAM 232.

Then, in the step ST24 the CPU 12 of the terminal equipment 11 transmits the message M12 which is generated by the CPU 12 itself to the IC card 21 using the command D which is in the format as seen in FIG. 15A. Here, the command D includes the function code which directs the deciphering of the transmitted message, the specifier which specifies the key data to be used for the data conversion (enciphering) in the data conversion in the IC card 21, and the message M6.

In the example shown in FIG. 6, the transaction key data (KEY12) transmitted by the command G is specified by the specifier in the step ST23. Upon receipt of this command D, the CPU 22 of the IC card 21 transmits the message M12 generated in the terminal equipment 11 to the host computer 1 in the same procedure as in the step ST22. This procedure has been explained above and is omitted here.

The data converters in the embodiments from Case I to Case VI explained before are equivalent to the enciphering and deciphering algorithms such as, for instance, DES (Data Encryption Standard), etc. Here, the enciphering and deciphering algorithms are not necessarily required to be exclusively provided for respective units and may be stored in a memory, for instance, as a program.

When the transaction key data KEYn and the transaction key data KEYn' which have been scrambled by the data converting function are both in 8 bytes, $$KEYn = E\ (CBC)\ Kn\ (KEYn') = EKn\ (KEYn')$$

$$KEYn' = D\ (CBC)\ Kn\ (KEYn') = DKn\ (KEYn')$$

and the above commands A and D can perform equivalent operations by the commands C and E, respectively.

Further, in the commands F and G, the data conversion key specifier to be used in the data conversion process and the key specifier to specify the existing key for converting to the restored key may be the same specifier. In this case, the transaction key used in the previous data conversion process becomes the key which is used in the data conversion process of this time.

Figure 25:
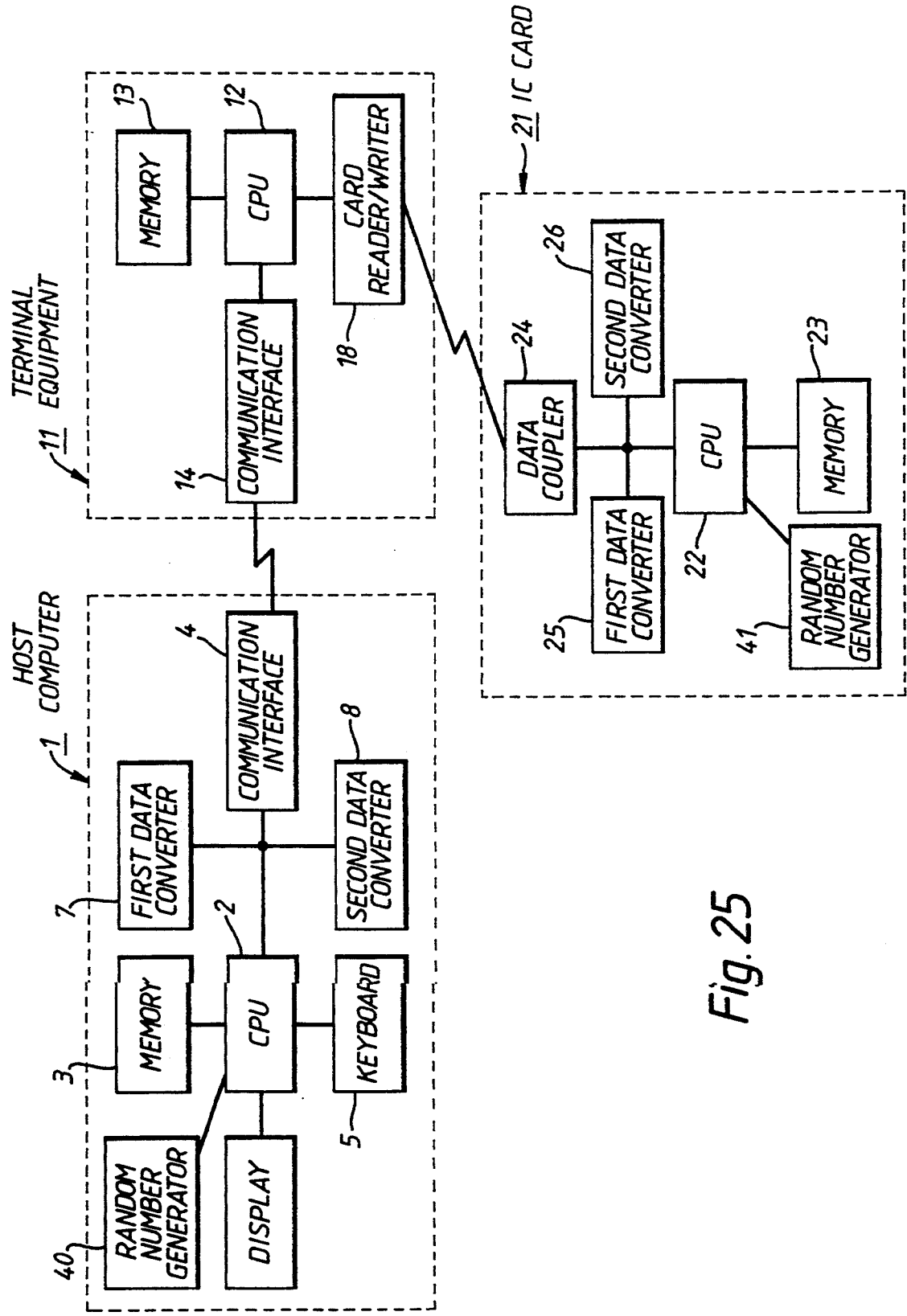
FIG. 25 is a block diagram of a system including the host computer, the terminal equipment and the IC card and of which the host computer and the IC card have two sets of data converters and a random number generator.

Further, in the above embodiment it has been assumed that the key data K1 through K12 and the transaction key data KEY1 through KEY12 have been stored in the memory in advance. On the system which has the random number generators 40 and 41 as seen in FIG. 25, data generated from the random number generators 40 and 41 may be used as the key data in the data conversion. Further, other components of the data communication system shown in FIG. 25 are the same as those of the system shown in FIG. 9 and therefore, the same numbers are assigned to the identical items and the explanations are omitted here.

Out of six data communication systems explained above, those described as Case I, Case III and Case V, both the host computer and the opposing equipment must be provided with an encipherer and a decipherer.

However, on the data communication systems explained as Case II, Case III and Case IV, if the host computer has, for instance, the decipherer only and the equipment opposing to the host computer has the encipherer only, the equivalent security level can be maintained. Further, the encipherer and the decipherer may be reversely provided to the host computer and the terminal equipment.

Further, out of the above six data communication systems, those shown in Cases III and IV have higher processing weight in the IC card than those shown in Cases I and II and the data security is improved. Furthermore, the data communication systems shown in Cases V and VI have high processing weight in the IC card than those shown in Cases III and IV and the data security is improved. Especially, on the data communication system shown in Cases V and VI, the number of commands required for the IC card is rather less and furthermore, the access flow between the host computer and the terminal equipment when transmitting messages becomes common, and the burden on the terminal equipment in the command control is thus decreased.

in this embodiment, when a data train is input to the IC card using a command, its result of operation is output as a response. The result of operation may be retained and called out in response to a request by other command.

Figure 26:
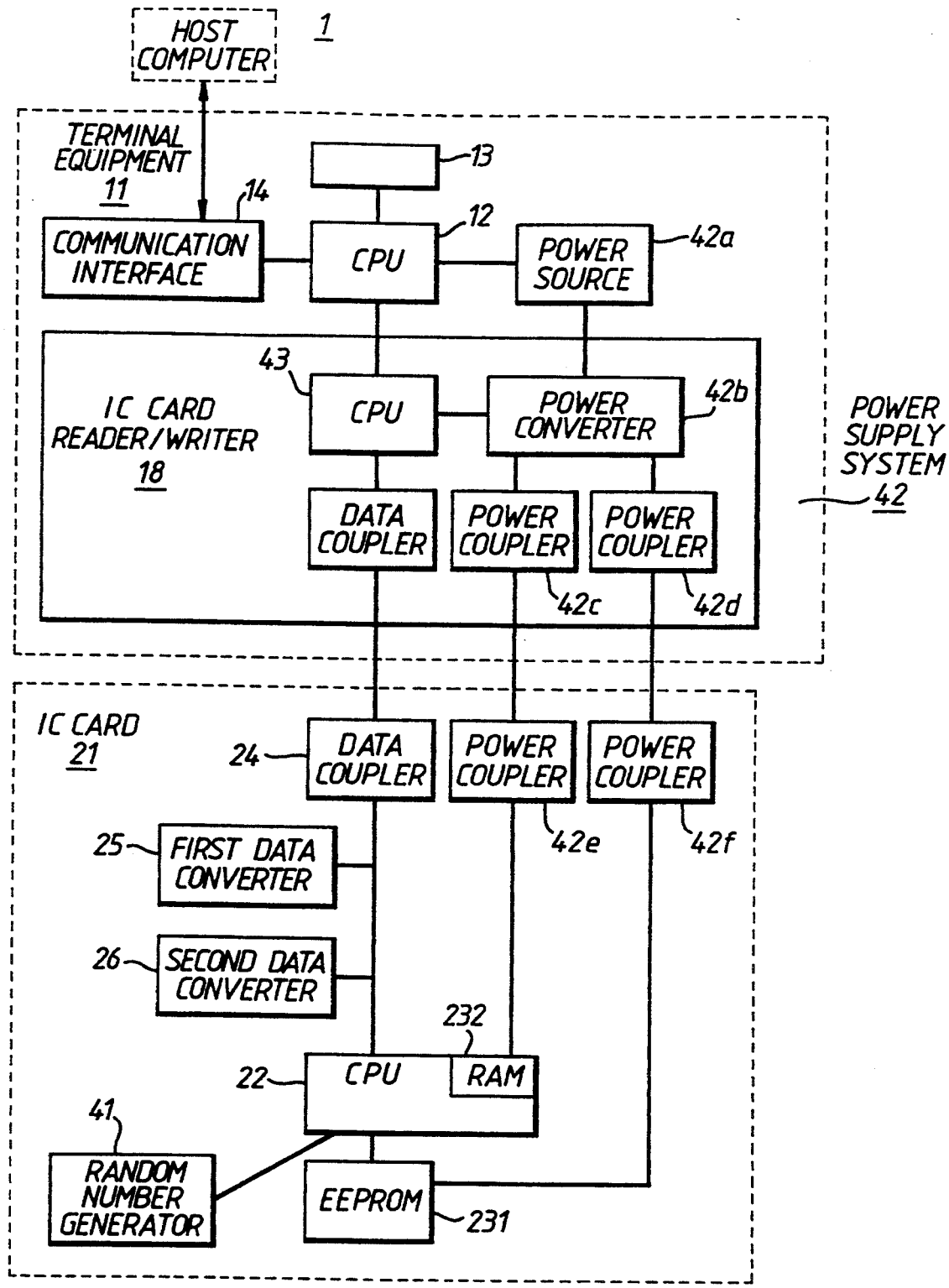
FIG. 26 is a block diagram of a modification of the system of FIG. 25.

Referring now to FIG. 26, a modification of the system according to the present invention will be briefly described. FIG. 26 shows a detailed construction of a part of FIG. 25, i.e., a section consisting of the terminal equipment 11 and the IC card 21 in FIG. 25. As shown in FIG. 26, this embodiment includes a power supply system 42. The power supply system 42 includes a power supplly 42a in the terminal equipment 11, a power converter 42b in the card reader/writer 18 of the terminal equipment 11, a pair of power couplers 42c and 42d also in the card reader/writer 18, and another pair of power couplers 42e and 42f in the IC card 21. The CPU 12 of the terminal equipment 11 is coupled to the power source 42a for controlling the power source 42a. The power converter 42b is coupled to the the power source 42a and a CPU 43 equipped in the card reader/writer 18 so that the power converter 42b converts the power from the power source 42a to a pair of suitably adjusted powers under the control of the CPU 43. A first adjusted power is supplied to the RAM 232 in the IC card 21 through a first set of the power couplers 42c and 42e. A second adjusted power is supplied to the EEPROM 231 through a second set of the power couplers 42d and 42f.

In the embodiment of FIG. 26, when the communication between the host computer 1 (see FIG. 25) and the IC card 21 through the terminal equipment 11 has completed, the supplied powers, i.e., the first and the second adjusted powers are interrupted. Then the memory in the EEPROM 231 is held in spite of the interruption of the first adjusted power, but the memory in the RAM 232 is eliminated in response to the interruption of the second adjusted power from the terminal equipment 11.

As described above in detail, when the data communication system of this embodiment is used, it is not necessarily required to have elements dedicated for data enciphering/deciphering and even when equipments with less resource are used as system components, it is possible to execute the data scramble on the line system.

Further, as key data used in the data communication are not left in the memory of the IC card used in the data communication system in this embodiment, the data security on the on-line system is sharply improved. In addition, when inputing the transaction key into the IC card, it is possible to specify whether the transaction key is retained in the EEPROM or the RAM, the data communication can be executed flexibly corresponding to a system using the transaction key.

Further, the IC card explained in this embodiment is capable of selecting key data for restoring the transaction key used in the data communication and it is therefore not necessary to fix the key to restore the transaction key by a system and the functions of the IC card are not restricted by a system.

When the enciphering/deciphering of data to be transmitted to the IC card, the transaction key for the data enciphering/deciphering is stored in the RAM 232 which is a volatile memory. Therefore, when the data transaction ends and the IC card is put in the off-line state, the transaction key data vanish. Thus, the transaction key required in the communication system is not left in the IC card and the security on the on-line communication system is improved. Furthermore, the memory capacity can be stored because the transaction key is not kept retained in the memory.

As described above, according to the present invention, for instance, on the on-line system including a host computer and the portable electronic apparatus according to the present invention, the transaction key data are not left in the portable electronic apparatus at time of the off-line.

Thus, when communicating enciphered data between a host computer and/or a terminal equipment the portable electronic apparatus according to the present invention is realized with a relatively simple construction.

Thus, when an on-line system using the portable electronic apparatus according to the present invention is constructed, the security of data to be communicated can be improved.

As described above, the present invention can provide an extremely preferable portable electronic apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A cipher communication system comprising:
   a first electronic device, the first electronic device comprising:
   first memory means for storing a master key data,
   means for generating a transaction key data which is used for enciphering the transaction data,
   means for enciphering the transaction key data according to the master key data, and
   means for transferring the transaction key data enciphered by the enciphering means;
   a second electronic device communicating with the first electronic device, the second electronic device comprising:
   means for receiving the enciphered transaction key data transferred from the first electronic device,
   second memory means for storing the master key data,
   means for deciphering the enciphered transaction key data received by the receiving means according to the master key data, and
   third memory means for temporarily storing the transaction key data deciphered by the deciphering means, in a manner causing the stored transaction key to be eliminated at a completion of the communication; and
   a terminal device, interposed between the first electronic device and the second electronic device, including means for providing power to and activating the second electronic device,
   the third memory means including RAM which holds its memory while power is supplied from the terminal device, the memory held within the RAM being automatically eliminated when there is an interruption of the power supply.

2. A cipher communication system comprising:
   a first electronic device, the first electronic device comprising:
   first memory means for storing a master key data,
   means for generating a transaction key data which is used for enciphering the transaction data,
   means for enciphering the transaction key data according to the master key data, and
   means for transferring the transaction key data enciphered by the enciphering means; and
   a second electronic device communicating with the first electronic device, the second electronic device comprising:
   means for receiving the enciphered transaction key data transferred from the first electronic device,
   second memory means for storing the master key data,
   means for deciphering the enciphered transaction key data received by the receiving means according to the master key data,
   third memory means for temporarily storing the transaction key data deciphered by the deciphering means, in a manner causing the stored transaction key to be automatically eliminated at a completion of the communication,
   a non-volatile memory for storing the transaction key data deciphered by the deciphering means, and
   means for selecting to store the transaction key data deciphered by the deciphering means into one of a group consisting of the non-volatile memory and the third memory means.

3. The system as claimed in claim 2, wherein the first electronic device further comprises:
   means for transferring information for selecting between the non-volatile memory means and third memory means of the second electronic device for storage of the transaction key data,
   and wherein the selecting means of the second electronic device selects between the non-volatile memory means and third memory means for storage of the transaction key data which is deciphered by the deciphering means, in response to the information transferred from the first electronic device.

* * * * *